us009772163B2

United States Patent
Sharrah et al.

(10) Patent No.: US 9,772,163 B2
(45) Date of Patent: Sep. 26, 2017

(54) MODULAR LIGHT MOUNTABLE ON A HANDGUN

(71) Applicant: STREAMLIGHT, INC., Eagleville, PA (US)

(72) Inventors: Jonathan R. Sharrah, Collegeville, PA (US); Jon Zeisler, Collegeville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 14/726,849

(22) Filed: Jun. 1, 2015

(65) Prior Publication Data

US 2016/0209168 A1  Jul. 21, 2016

Related U.S. Application Data

(60) Provisional application No. 62/103,680, filed on Jan. 15, 2015.

(51) Int. Cl.
| | |
|---|---|
| *F41G 1/35* | (2006.01) |
| *F41G 11/00* | (2006.01) |
| *H05B 33/08* | (2006.01) |

(52) U.S. Cl.
CPC .............. *F41G 1/35* (2013.01); *F41G 11/004* (2013.01); *H05B 33/0809* (2013.01); *H05B 33/0824* (2013.01)

(58) Field of Classification Search
CPC .................................. F41G 1/35; F41G 11/004
(Continued)

(56) References Cited

U.S. PATENT DOCUMENTS 4,177,754 A * 12/1979 James .................. C21D 9/5732
118/47
5,042,186 A  8/1991 Bechtel
(Continued)

FOREIGN PATENT DOCUMENTS

EP  3045857  7/2016

OTHER PUBLICATIONS

European Patent Office, "European Search Report, EP Application No. 16150798", dated May 19, 2016, 8 pages.
(Continued)

*Primary Examiner* — Reginald Tillman, Jr.
(74) *Attorney, Agent, or Firm* — Clement A. Berard, Esq.; Dann, Dorfman, Herrell & Skillman, PC

(57) ABSTRACT

A light mountable on a handgun may comprise: a light module including one or more light sources, a cavity for a source of electrical power, a switch, a circuit for energizing the light sources; and an outer housing having complementary parts configured to enclose the light module and a part of the handgun. The outer light housing may include an access cover that is openable when the light is mounted on a handgun, for placing and removing the source of electrical power. Light sources may include an illumination source and an aiming source. A lighting circuit includes a controllable electronic device in series with a power terminal of a controller, wherein operation of the switch causes the controller to maintain the electronic device conductive, whereby the controller then remains powered; and wherein the controller responds to a subsequent operation of the switch to render the electronic device nonconductive, whereby the controller is then unpowered even when electrical power is received.

31 Claims, 11 Drawing Sheets

(58) Field of Classification Search
USPC .................. 42/114, 123, 146, 115, 117
See application file for complete search history.

(56) References Cited

U.S. PATENT DOCUMENTS

| | | | |
|---|---|---|---|
| 5,581,898 | A | 12/1996 | Thummel |
| 5,628,555 | A | 5/1997 | Sharrah et al. |
| 5,685,105 | A | 11/1997 | Teetzel |
| 5,758,448 | A | 6/1998 | Thummel |
| 5,787,628 | A | 8/1998 | Teetzel |
| 6,154,995 | A | 12/2000 | Lenoir |
| 6,230,431 | B1 | 5/2001 | Bear |
| 6,276,088 | B1 | 8/2001 | Matthews |
| D567,894 | S | 4/2008 | Sterling |
| 7,726,061 | B1* | 6/2010 | Thummel ............... F41G 1/35 42/115 |
| 7,735,255 | B1 | 6/2010 | Kincaid |
| 7,934,333 | B1 | 5/2011 | Tuz |
| 8,169,165 | B2 | 5/2012 | West |
| 8,256,154 | B2 | 9/2012 | Danielson |
| D674,858 | S | 1/2013 | Galli |
| 8,510,979 | B1 | 8/2013 | Mortimer |
| 8,683,731 | B2 | 4/2014 | Kowalczyk |
| 8,683,733 | B2 | 4/2014 | Gross |
| 8,713,844 | B2 | 5/2014 | Tuller, Jr. |
| 8,760,085 | B2 | 6/2014 | West |
| D709,981 | S | 7/2014 | Johnston |
| 8,904,698 | B2* | 12/2014 | Riley ............... F41G 1/35 362/110 |
| 8,915,009 | B2 | 12/2014 | Caulk |
| 9,035,576 | B2 | 5/2015 | West |
| D738,455 | S | 9/2015 | Homem de Mello Anderson |
| D738,457 | S | 9/2015 | Johnston |
| 9,182,194 | B2 | 11/2015 | Moore |
| 9,341,440 | B2 | 5/2016 | Moore |
| 9,488,439 | B2 | 11/2016 | Galli |
| 9,658,031 | B1 | 5/2017 | Hedeen |
| 2002/0100204 | A1 | 8/2002 | Kim |
| 2002/0148153 | A1 | 10/2002 | Thorpe |
| 2005/0246937 | A1 | 11/2005 | Kim |
| 2008/0120891 | A1 | 5/2008 | Wei |
| 2009/0013580 | A1* | 1/2009 | Houde-Walter ...... F41G 11/003 42/114 |
| 2012/0124885 | A1 | 5/2012 | Caulk |
| 2012/0144718 | A1 | 6/2012 | Danielson |
| 2013/0074351 | A1 | 3/2013 | Kowalczyk |
| 2013/0145672 | A1 | 6/2013 | Tuller, Jr. |
| 2015/0102743 | A1 | 4/2015 | West |
| 2015/0113851 | A1 | 4/2015 | Bensayan |
| 2015/0159847 | A1 | 6/2015 | Galli |
| 2015/0192391 | A1* | 7/2015 | Moore ............... F41G 1/35 42/117 |
| 2015/0233668 | A1 | 8/2015 | Moore |
| 2015/0276347 | A1 | 10/2015 | Sharrah |
| 2015/0276352 | A1* | 10/2015 | Chang ............... F41G 11/003 42/114 |
| 2016/0021329 | A1 | 1/2016 | Sakiewicz |
| 2016/0209167 | A1 | 7/2016 | Wells |
| 2016/0305742 | A1 | 10/2016 | Kowalczyk, Jr. |

OTHER PUBLICATIONS

Streamlight, Inc., "TLR-6 Subcompact Gun-Mounted Tactical Light With Integrated Red Aiming Laser", © 2016, 5 pages, www.streamlight.com.

Crimson Trace Corporation, "LTG-736 Lightguard for Glock Full-Size and Compact", © 2016, 3 pages, http://www.crimsontrace.com/.

Crimson Trace Corporation, "LG-452 Laserguard Green Laser Sight for Glock Full-Size and Compact", © 2016, 7 pages, http://www.crimsontrace.com/.

Crimson Trace Corporation, "DS-121 Defender Series Accuguard Laser Sight for Glock Full-Size and Compact", © 2016, 10 pages, http://www.crimsontrace.com/products/manufacturer/glock/01-5100.

Streamlight, Inc., "Light Mountable on a Handgun", U.S. Appl. No. 29/570,804, filed Jul. 12, 2016, 30 pages.

Streamlight, Inc., "Modular Light Mountable on a Handgun—U.S. Appl. No. 15/283,788", filed Oct. 3, 2016, 51 Pages.

U.S., "Office Action—U.S. Appl. No. 15/283,788", dated May 3, 2017, 30 Pages.

Laserlyte, "Sight TGL DB .380/9MM Tan", printed Jan. 13, 2015, 4 pages, http://www.laserlyte.com/products/sight-tgl-diamondback-380-9mm-tan.

Laserlyte, "Glock Lasers", printed Jan. 13, 2015, 1 page, http://www.laserlyte.com/collections/glock.

Laserlyte, "Springfield XD/XDM/XDS Lasers", printed Jan. 13, 2015, 1 page, http://www.laserlyte.com/collections/xd-xdm-xds.

Laserlyte, "SCCY Laser Sight", printed Jan. 13, 2015, 1 page, http://www.laserlyte.com/collections/sccy-laser-sight.

Laserlyte, "Hi-Point Laser", printed Jan. 13, 2015, 1 page, http://www.laserlyte.com/collections/hi-point-laser.

Laserlyte, "Closeouts", printed Jan. 13, 2015, 1 page, http://www.laserlyte.com/collections/discontinued-closeouts.

Laserlyte, "UTA-DB Diamondback Laser", Rev Aug. 2013, 2 pages, www.laserlyte.com.

Diodes Incorporated, "PAM2804 1A Step Down Constant Current, High Efficiency LED Driver", Jan. 2013, 10 pages.

Microchip Technology, Inc., "PIC12F7525/HV752 Data Sheet, 8-Pin, Flash-Based 8-Bit CMOS Microcontrollers", © 2011, 210 pages.

Crimson Trace Corporation, "Crimson Trace CMR-202 Rail Master", Instruction Handbook, 27-1455 REV001 Apr. 2012, 2 pages.

USPTO, "Notice of Allowance", U.S. Appl. No. 29/570,804, dated Jun. 23, 2017, 10 pages.

* cited by examiner

MODULAR LIGHT MOUNTABLE ON A HANDGUN

This Application hereby claims the benefit of U.S. Provisional Patent Application No. 62/103,680 filed Jan. 15, 2015 entitled "MODULAR LIGHT MOUNTABLE ON A HANDGUN," which is hereby incorporated herein by reference in its entirety.

The present invention in one aspect relates to a light mountable on a firearm and, in particular, to a light mountable on a handgun.

The present invention in another aspect relates to an electrical circuit for reducing the standby power of an electrical lighting circuit that may be configured to be employed in a light mountable on a handgun or other firearm, and/or to be employed in another portable light.

Lights mountable on a firearm are available in many configurations. For lights mountable on a handgun e.g., a pistol, the selection of available lights is quite limited. An owner of several such firearms must have separate lights each of which is configured to mount to a particular handgun, and must choose between a light providing illumination, e.g., a beam of light for illuminating an area, and a light providing a laser spot beam for aiming the firearm.

This situation not only limits the type of light available to a firearm owner at any given time, but results in significant expense to acquire plural lights each mountable on a particular handgun and providing a particular kind of light.

In addition, presently known available handgun lights must be removed from the firearm, which requires a tool, in order to change the battery, which is both time consuming and inconvenient. For such lights that provide a laser spot beam aiming light, the alignment of the laser beam with the firearm sighting for accurately aiming the firearm is lost when the light is removed from and reinstalled on the firearm. Each of these conditions is a severe disadvantage, and for military and police handgun users, could increase risk to life and limb.

In addition, certain electrical lighting devices may be used intermittently and so may remain unused for substantial periods. Modern portable lights often include sophisticated control circuitry that includes a microprocessor that, even though placed into a low power or "sleep" mode, still draws electrical power from the battery even during times when the light is "off." While such standby power drain may be small, over a substantial period of time it can consume a significant portion of the available charge of the battery of a portable light, such as a light mountable on a firearm or other portable light. As a result, such light may not operate or may operate only for a short time after a sustained period of storage or non-use, which could place the user thereof at risk.

Consider a person who needs an infrequently used flashlight or other portable light in an urgent or dangerous situation, e.g., in a natural disaster or to respond to an intruder, only to find at such critical time that its battery is dead. One example thereof could include a homeowner or business that keeps a firearm for self protection where the firearm and the light associated with such firearm is infrequently or rarely used. While the battery in such infrequently used light should be checked and/or replaced periodically, the practical fact is that often it is not and so could be depleted by the standby power that is drawn by the light when it is "off.".

Applicant believes there may be a need for a light mountable on a handgun that can be mounted to different handguns without having to obtain an additional light for each type of handgun. It is also believed to be advantageous for a light for a handgun to provide both light for illumination and a laser spot beam for aiming.

Applicant also believes there may be a need for an electrical circuit for a portable light that reduces the standby power drain in the "off" state, thereby to extend the storage time of the light, substantially to the shelf life of the battery itself.

Accordingly, a light mountable on a handgun may comprise: a light module including one or more light sources, a cavity for a source of electrical power, a switch, and a circuit for energizing the light sources; an outer light housing may have complementary housing parts enclosing the light module, and defining a cavity configured to receive a part of the handgun and an opening through which the electrical switch of the light module is actuatable; and the outer light housing may include an access cover that is openable when the light is mounted on a handgun, for placing and removing the source of electrical power from the light module.

According to another aspect, a light mountable on a handgun may comprise: a light module including one or more light sources, a cavity for a source of electrical power, a switch, and a circuit for energizing the light sources; an outer light housing may have complementary housing parts enclosing the light module, and defining a cavity configured to receive a part of the handgun and an opening through which the electrical switch of the light module is actuatable.

According to yet another aspect, a light mountable on a handgun may comprise: a light module including an illumination light source and a laser aiming light source, a cavity for a source of electrical power, an electrical switch, and a circuit for energizing the illumination light source and the laser aiming light source; an outer light housing enclosing the light module, and defining a cavity configured to correspond to a trigger guard of the handgun, and having an opening through which the electrical switch is actuatable from outside the outer light housing; and the outer light housing may include an access cover on an exterior surface that is not adjacent the handgun that is openable when the light is mounted on a handgun for placing a source of electrical power into the light module housing and for removing the source of electrical power from the light module housing.

According to a further aspect, an electrical lighting circuit may comprise: a control processor having a control input, having a control outputs, and having first and second power terminals; an electrical switch contact selectively connecting one of first and second terminals to the control input of the control processor; a first controllable electronic device having a controllable conduction path connected between the first terminal and the first power terminal of the control processor, and having a control electrode coupled to a first control output of the control processor; wherein when electrical power is received at the first and second terminals, the control processor is responsive to the electrical switch contact to provide a control voltage to the control electrode of the first controllable electronic device to maintain the first controllable electronic device conductive; and wherein the control processor is subsequently responsive to the electrical switch contact to remove the control voltage to the control electrode of the first controllable electronic device to render the first controllable electronic device nonconductive, whereby the control processor is then unpowered even when electrical power is received.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1A:
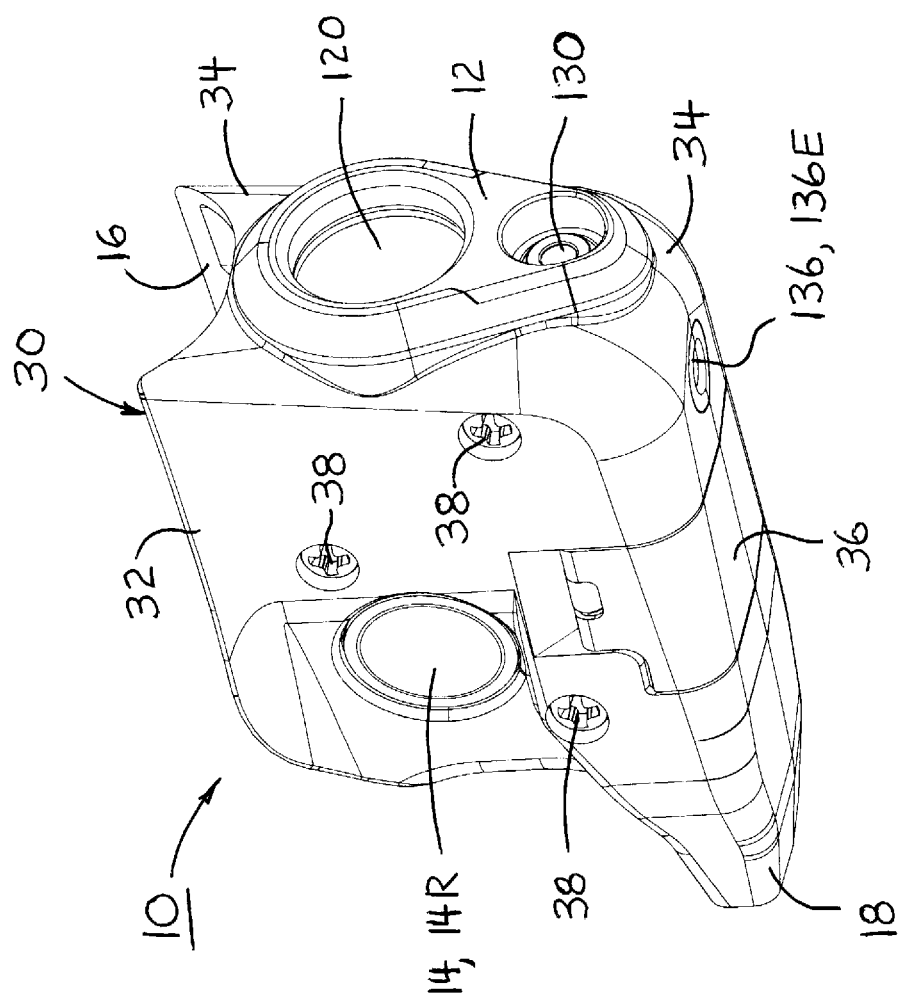
FIGS. 1A and 1B are perspective views of an example embodiment of a light mountable on a handgun.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1B:
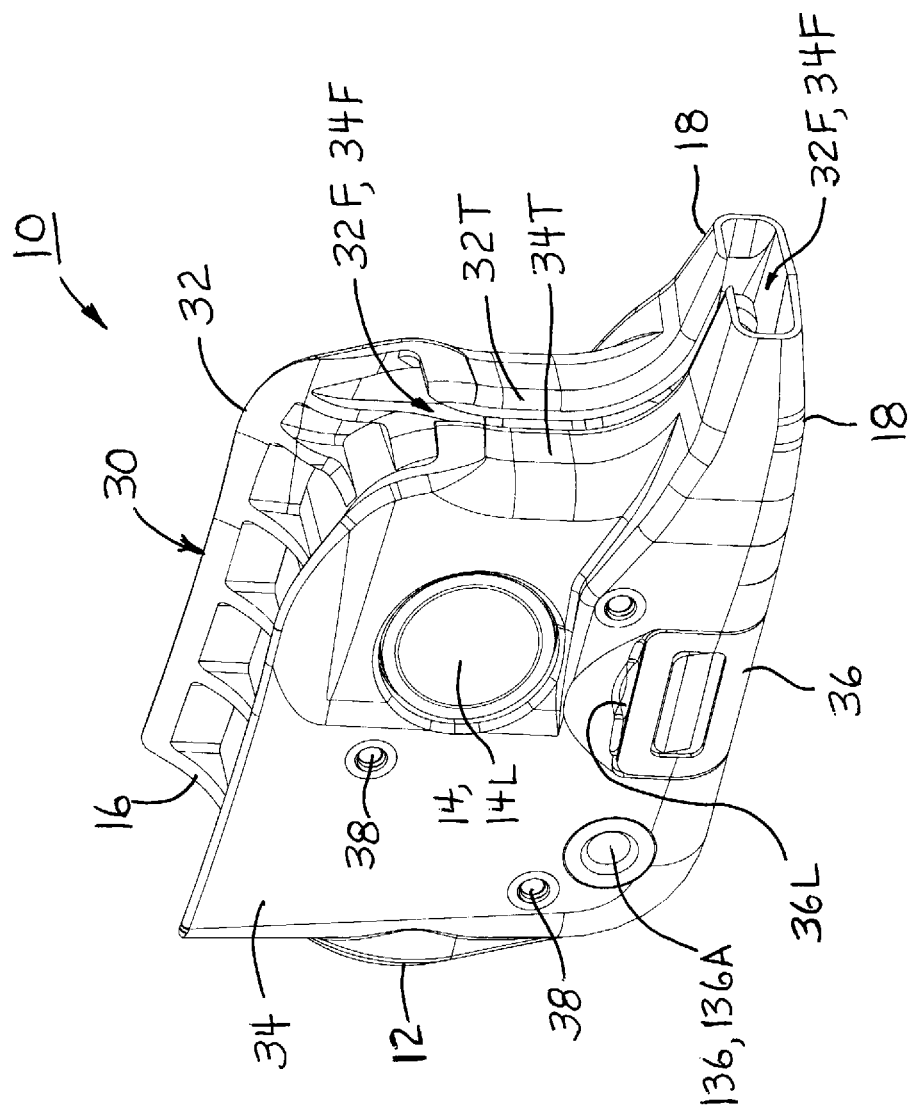
Figure 1C:
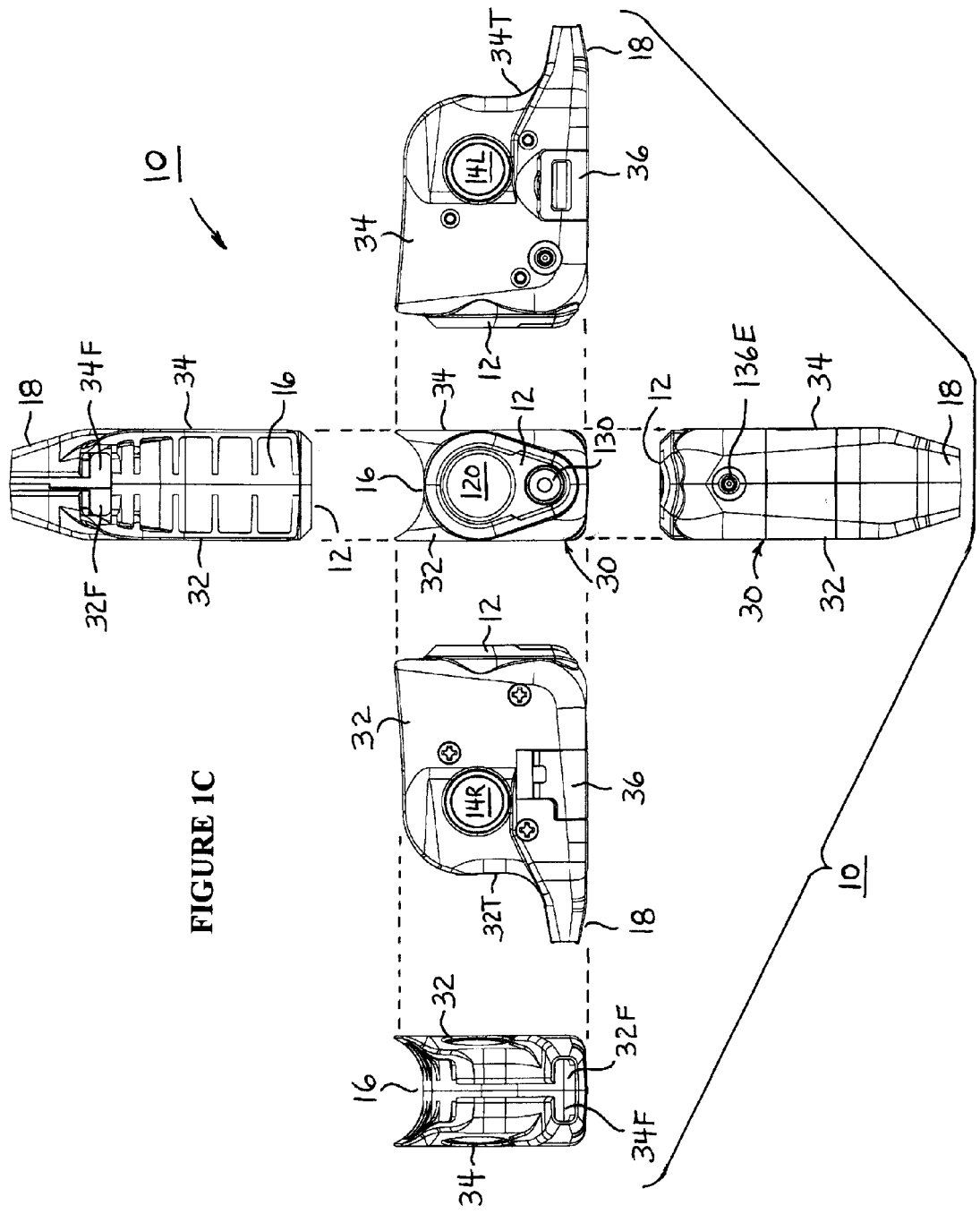
FIG. 1C shows six orthogonal views thereof.
Figure 2:
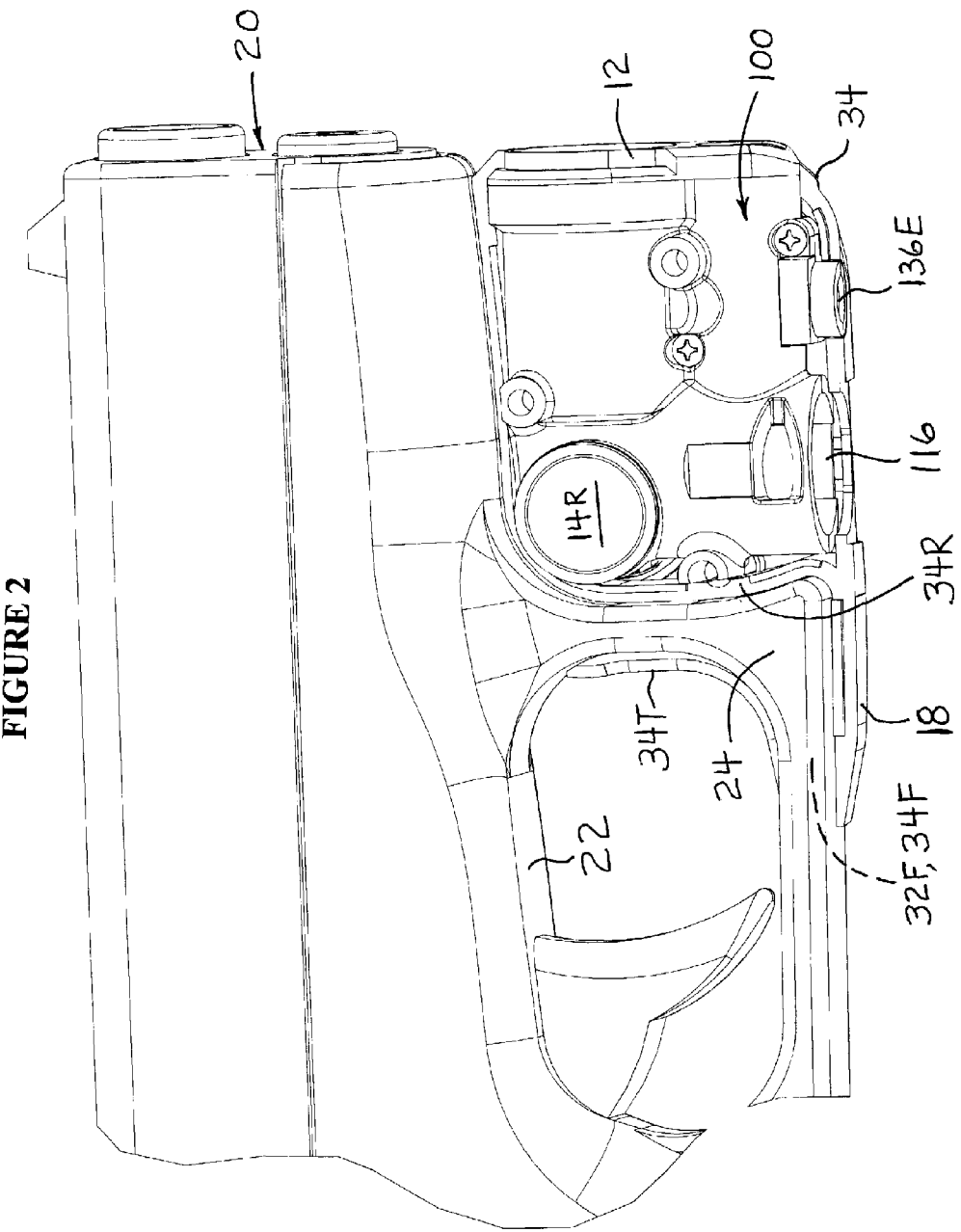
FIG. 2 is a side view of the example light of FIG. 1 with part of its housing removed to show a modular lighting device therein and to show the housing engaging the frame of a handgun.

FIG. 1 includes FIGS. 1A and 1B which are perspective views of an example embodiment of a light 10 mountable on a handgun 20, e.g., a pistol 20, viewed generally from the front and from the rear, and FIG. 1C which shows six orthogonal views thereof, and FIG. 2 is a side view of the example light 10 of FIG. 1 with part of its housing 30 removed to show a modular lighting device 100 therein and to show the outer housing 30 engaging the frame 22 of a handgun 20.

Example light 10 is intended to attach to a part of the frame 22 of a handgun 20, e.g., to a trigger guard 24 thereof by trigger guard extension 18, and to be positioned under the barrel 26 thereof, for which a generally barrel-shaped recess 16 is provided. While disposing the barrel of handgun 20 in barrel-shaped recess 16 may assist in stabilizing light 10 relative to handgun 20, it also provides a beneficial aesthetic look.

Light 10 provides light in a forward direction via a forward lens assembly 12, e.g., in a direction generally aligned with the trajectory of a projectile fired from handgun 20. Preferably, example light 10 provides light for illumination of an area, which is emitted by illumination light source 120, and provides light for aiming handgun 20, which is emitted by laser light source 130. In such instance, light source 120 provides a wider beam, e.g., a flood beam, and light source 130 provides a very narrow spot beam.

Light 10 includes at least one external actuator 14 by which either or both of light sources 120, 130 may be selectively energized to produce light. Because shooters may be right handed or left handed, actuator 14 preferably includes two actuators providing the same functionality: an actuator 14R on the right side of light 10 that can be actuated by a right finger of a shooter gripping handgun 20 with his right hand and an actuator 14L on the left side of light 10 that can be actuated by a left finger of a shooter gripping handgun 20 with his left hand. Preferably, while either of actuators 14R and 14L can be utilized independently to provide the full range of operating states of illumination light source 120 and of laser light source 130, it is also preferred that actuators 14R, 14L can also be utilized in combination to also provide the full range of operating states of light sources 120, 130.

In the modular configuration of light 10, a modular light source 100 that includes all of the operating elements of a light, e.g., a housing 110, one or more light sources 120, 130, a cavity for an electrical power source 150, and a switch 146 for actuating the one or more light sources 120, 130, is enclosed in an outer light housing 30, and so outer housing 30 provides an enclosure and support for light module 100 as well as support for the complete light 10 on handgun 20. Because the parts of light 10 that are most necessary for providing light and are also the most costly are contained in light module 100, that light module 100 can be configured to be a light 10 mountable on the frames of different handguns by merely replacing the outer light housing 30 with an outer housing 30 configured to be mounted to the frame of a different particular handgun.

Outer housing 30 includes first and second sides 32, 34, e.g., a right side 32 and a left side 34, that are complementary in shape so as to mate together and provide a complete enclosure for light module 100 and a frame cavity 32F, 34F which is configured to surround and clamp to a portion of the frame 22 of a handgun 20, e.g., around a trigger guard 24 thereof. The respective parts of outer housing sides 32, 34 that cooperate to provide trigger guard extension 18 cooperate to define a frame cavity that is formed by complementary frame cavities 32F, 34F of the right and left housing sides 32 and 34, respectively. The frame cavities 32F, 34F are respectively defined by the respective trigger guard extensions 18R, 18L of outer housing sides 32, 34 and by the respective backing members 32T, 34T thereof which are configured to complement and surround the frame 22, e.g., trigger guard 24, of a particular handgun 20.

In a pair of outer housing sides 32, 34 of a particular outer light housing 30, cavities 32F, 34F are configured to receive part of the frame 22, e.g., the trigger guard, of a particular handgun 20. Other pairs of outer housing sides 32, 34 of other particular light outer housings 30, define other cavities 32F, 34F that are configured to receive part of the frame 22, e.g., the trigger guard, of different particular handguns 20, thereby to facilitate the interchangeability of light module 100 from one handgun to another by merely changing the outer light housing 30.

Each side 32, 34 of outer light housing 30 has an actuator opening 32A, 34A through which access can be made to actuate switch 146, e.g., right and left side switches 146R, 146L of light module 100, and each of openings 32A, 34A is located on housing sides 32, 34 in a position adjacent to and aligned with switches 146R and 146L, respectively. Each of openings 32A, 34A may be covered with a flexible film or membrane or boot to reduce the entry of dirt, water and other unwanted foreign matter into outer light housing 30.

The interior surfaces of each side 32, 34 of outer light housing 30 preferably has an arrangement of ribs, posts and other projections that are configured to abut light module 100 for supporting light module 100 within outer housing 30 in a predetermined position and for providing structural strength therefor. The arrangements of ribs, posts and other projections associated with cavities 32F, 34F that are configured to receive part of the frame 22, e.g., the trigger guard, are configured to abut the part of the frame 22 to which light 10 is mounted so as to clamp light 10 to the part of the frame 22 sufficiently tightly to securely mount light 10 in a desired position relative to handgun 20.

Installing and/or removing example light 10 from a handgun 20 simply involves removing the fasteners 38 that secure the sides 32, 34 of outer light housing together and light module 100 therein, placing (or removing) the sides 32, 34 with light module 100 therein in their respective positions relative to frame 22 of handgun 20, and replacing and tightening fasteners 38 to secure light 10 in position on frame 22 of handgun 20.

Figure 3A:
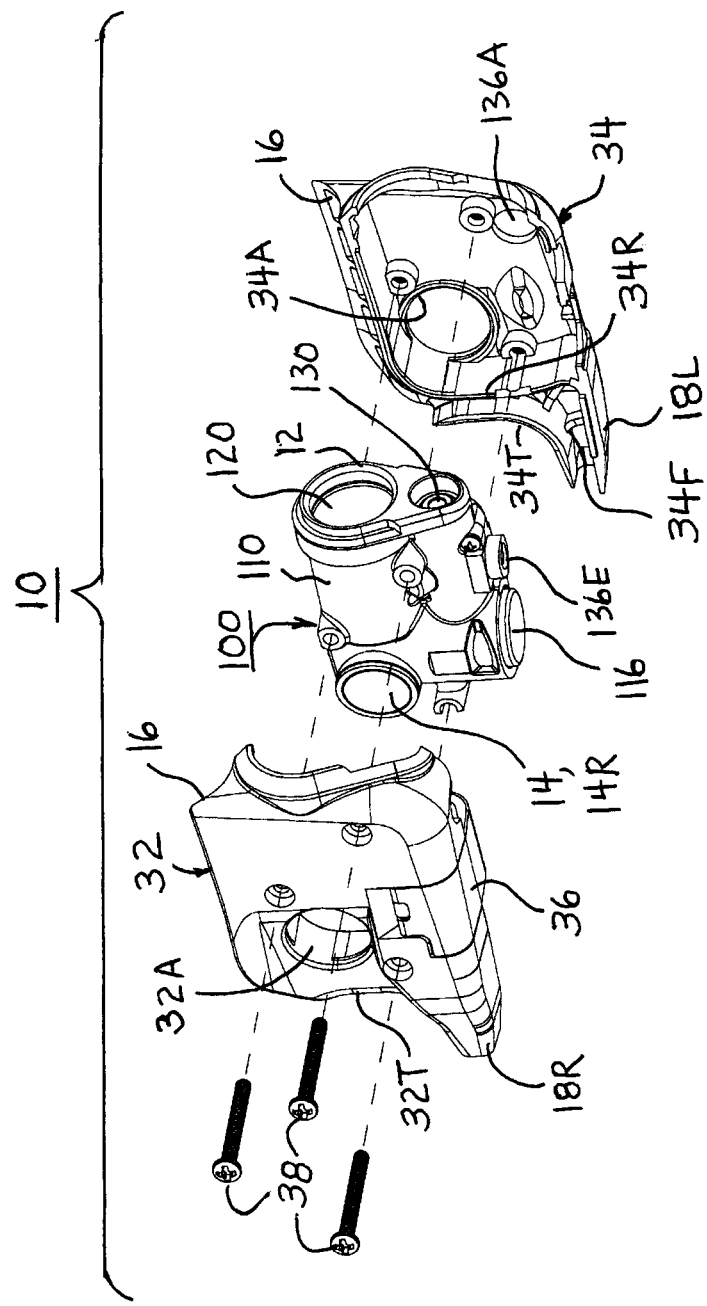
FIG. 3A is an exploded view of the example light of FIGS. 1 and 2 with light module therein.
Figure 3B:
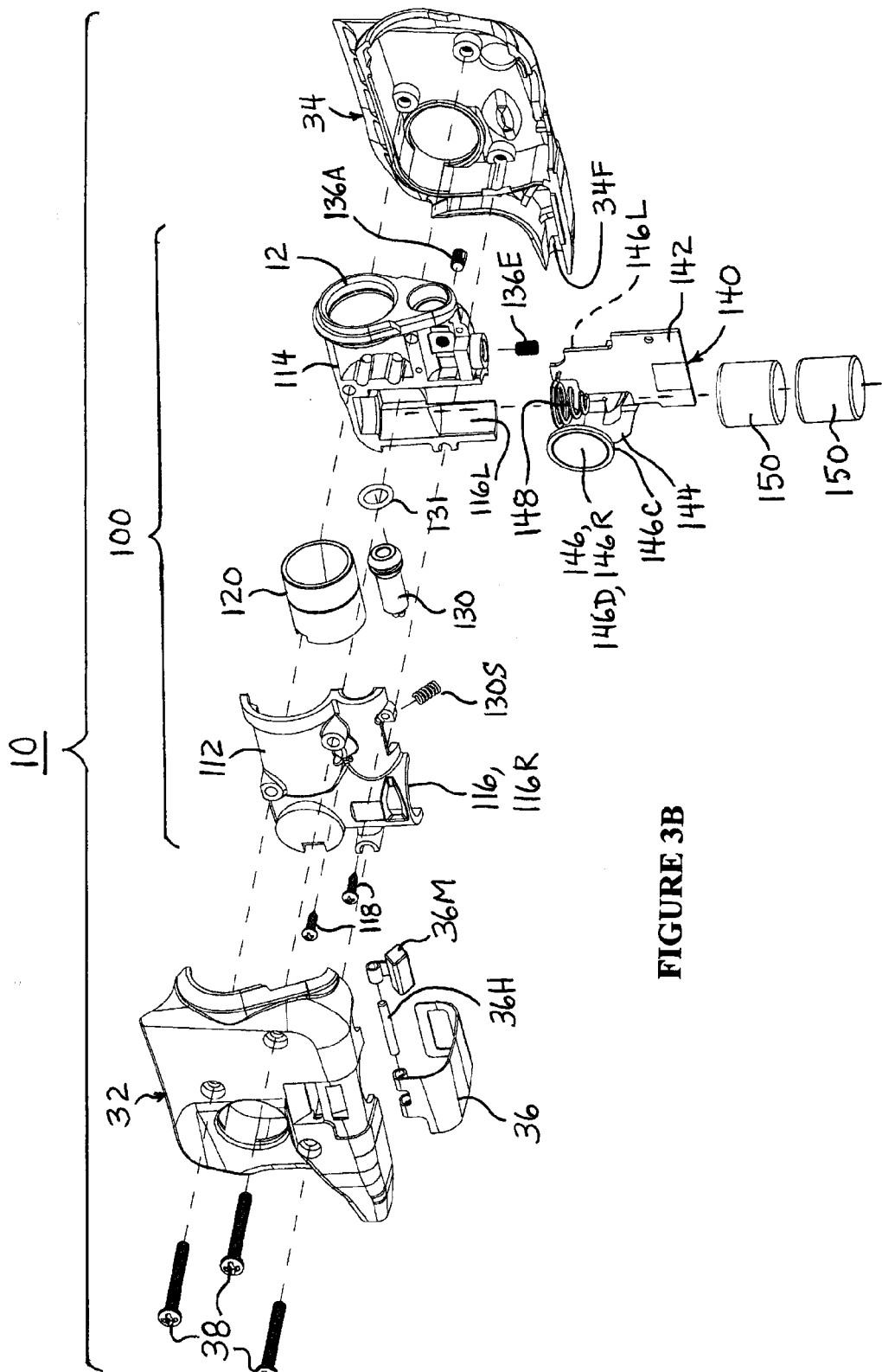
FIG. 3B is an exploded view of the example light and of the example light module.
Figure 4A:
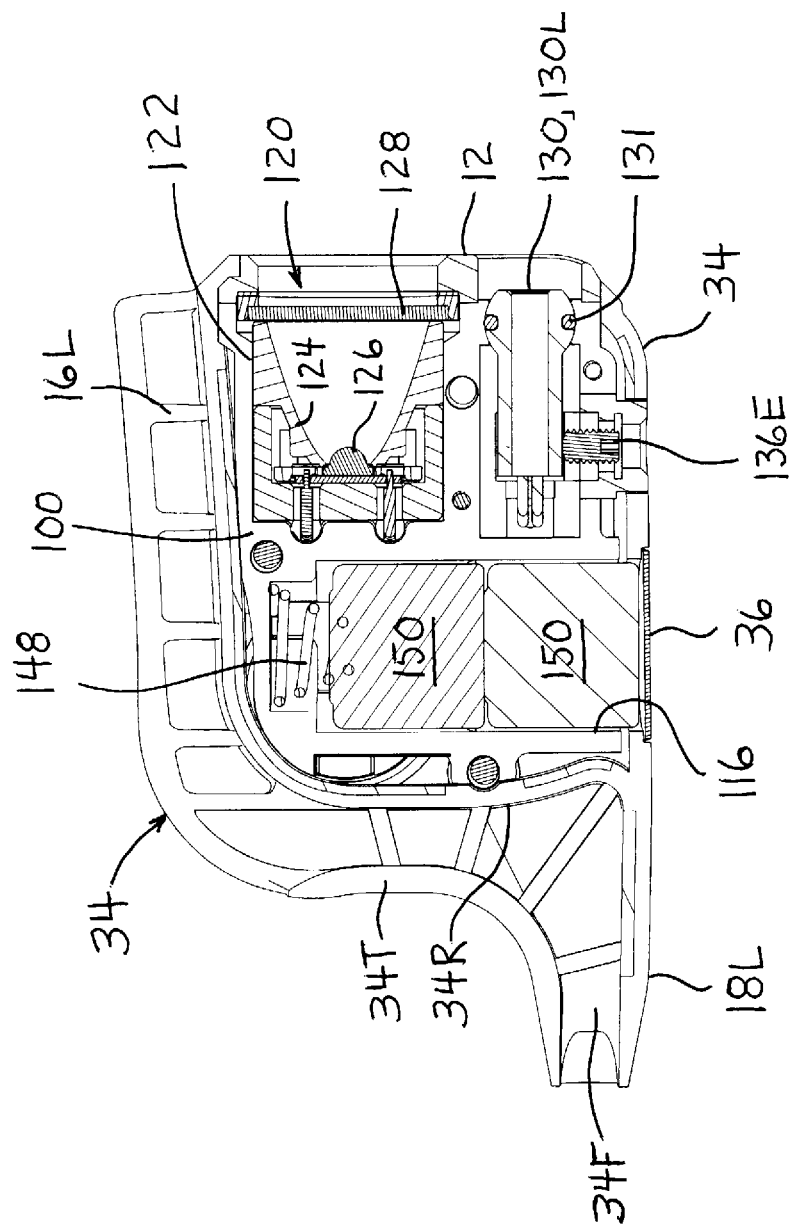
FIG. 4A is a longitudinal cross-sectional view and FIGS. 4B and 4C are different transverse cross-sectional views of the example light and example light module of FIGS. 1-3.
Figure 4B:
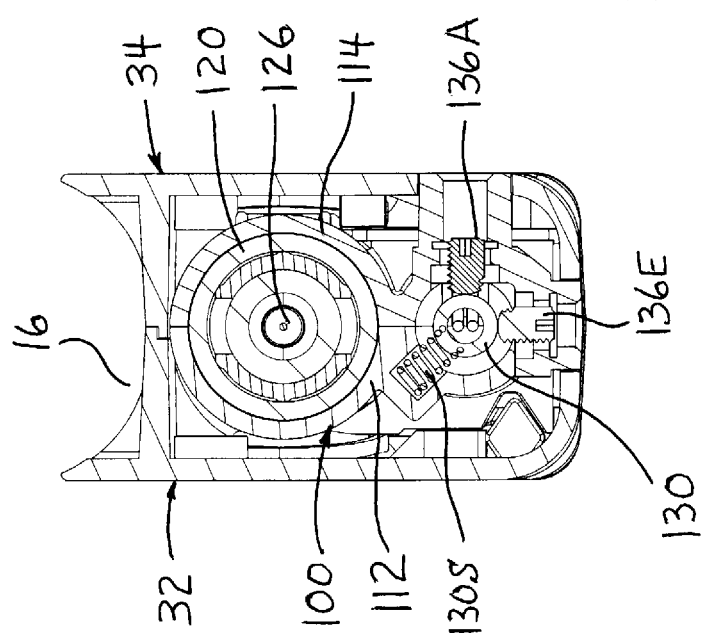
Figure 4C:
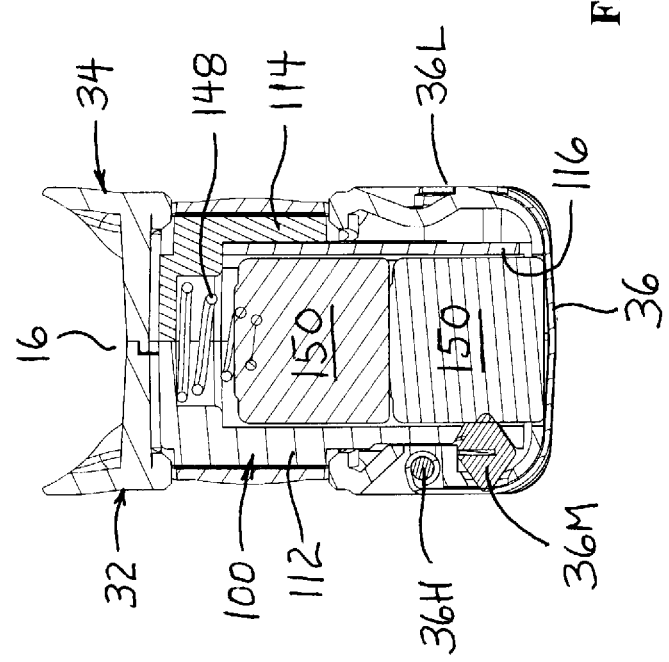

FIG. 3 includes FIG. 3A which is an exploded view of the example light 10 of FIGS. 1 and 2 with light module 100 therein, and FIG. 3B which is an exploded view of the example light 10 and of the example light module 100; and FIG. 4 includes FIG. 4A which is a longitudinal cross-sectional view of the example light 10 and example module 100 of FIGS. 1-3, and FIGS. 4B and 4C which are different transverse cross-sectional views of the example light 10 and example module 100 of FIGS. 1-3.

Outer light housing 30 sides 32, 34 are seen to fit together similar to a clamshell to surround and enclose light module 100 therein and to have rims formed to receive forward lens assembly 12 in the forward ends thereof and to define the frame cavity 32F, 34F near the rearward end thereof. The rearward portions 32R, 34R of the rim of sides 32, 34 cooperate with each other and with backing members 32T, 34T and trigger guard extensions 18R, 18L to define frame cavity 32F, 34F into which a part of frame 22 of handgun 20, e.g., trigger guard 24 thereof, is received for attaching light 10 to handgun 20. One or more fasteners 38 retain outer housing sides 32, 34 together and light 10 on handgun 20.

Light module 100 is seen to have a housing 110 including housing sides 112, 114 that fit together and are retained together by one or more fasteners 118. Light module housing 110 preferably encloses light sources 120, 130 and circuit structure 140 therein, and provides a cavity 116 for receiving one or more batteries 150 therein. Light module 100 provides a forward lens assembly 12 at the forward end of housing 110 thereof and actuators 14R, 14L on opposing sides thereof in locations to be adjacent to the respective actuator openings 32A, 34A of outer light housing 30. Forward lens assembly 12 may have respective openings for light sources 120, 130, and a lens may be provided at lens assembly 12 and/or as part of light sources 120, 130.

Illumination light source 120 preferably includes an outer housing 122, a reflector 124, e.g., defined by the interior shape of outer housing 122, a light emitting diode (LED) light source 126, typically a while LED, for providing an illumination light beam, e.g., typically a relatively wide or flood beam of light, e.g., a beam having a beam width of about 10° to 150° or more. A lens 128 is provided at the forward end of housing 122 and reflector 124 through which light produced by LED 126 passes.

Laser light source 130 includes a laser diode and lenses to provide a very narrow beam of coherent light, e.g., a laser beam having a divergence of only about ±2°. A lens 130L may be provided as part of laser cartridge 130 or separately between laser cartridge 130 and lens assembly 12. Because laser light source 130 is intended to be used for aiming the handgun 20 to which light 10 is attached, the alignment of the laser light beam produced thereby and the bore sight of handgun 20 are preferably brought into alignment to be coincident so that the target illuminated by the laser beam will be the target hit by a projectile launched from the handgun.

To this end, laser light cartridge 130 is movably supported in a cavity of light module housing 110, e.g., with its forward end bearing against an O-ring 131, or grommet, ball joint or other joint 131, with respect to which cartridge 130 may pivot over a range of angles, wherein its longitudinal axis is movable, e.g., is pivotable or rotatable, in both azimuth and elevation relative to light 10 (and handgun 20 to which light 10 is mounted). In one example embodiment, laser cartridge 130 is rotatable over about ±5° relative to the housings 110, 30 of module 100 and of light 10.

Azimuth adjustment 136A may include a screw 136A that is threaded into a horizontal hole in housing side 114 to bear against the side of laser cartridge 130 so that by rotating adjustment screw 136A in one direction or the other, laser cartridge 130 may be moved, e.g., pivoted, to the right or to the left to adjust the azimuth direction of the laser light beam produced by laser cartridge 130. Similarly, elevation adjustment 136E may include a screw 136E that is threaded into a vertical hole in housing side 114 to bear against the underside of laser cartridge 130 so that by rotating adjustment screw 136E in one direction or the other, laser cartridge 130 may be moved, e.g., pivoted, upward or downward to adjust the elevation direction of the laser light beam produced by laser cartridge 130. Biasing spring 130S is positioned at an about 45° angle to urge laser cartridge 130 against both adjustment screws 136A and 136E so that the position and alignment of laser cartridge 130 is maintained in the position to which it is adjusted by adjustment screws 136A, 136E.

One or more batteries 150 may be disposed in battery cavity 116 of light module 100 which is defined by right and left portions 116R, 116L of module housing sides 112, 114. Electrical connection to a battery terminal at the upper end of batteries 150 may be provided by an electrical contact 148, e.g., a helical or conical spring 148, of circuit structure 140 and electrical connection to a battery terminal at the lower end of batteries 150 may be facilitated and/or provided by battery cover 36 of outer light housing 30.

Battery access cover 36 is hinged 36H to, e.g., right housing side 32, by, e.g., a hinge pin 36H and has a formed recess or projection 36L at the opposite end thereof which engages a corresponding projection or recess on the outer surface of left housing side 34 thereby to latch and retain battery access cover 36 in its closed position, thereby to retain batteries 150 in light 10, and to unlatch so that batteries 150 may be removed and/or replaced. Preferably, access cover snaps on when pressed closed and can be snapped off to be opened, e.g., using a finger or a coin, without the need for a tool. An advantage to this arrangement is that the batteries 150 may easily and conveniently be replaced without having to remove light 10 from the handgun 20, and preferably without the need for a tool.

A movable member 36M is provided adjacent to battery cover 36 so that it is positioned between battery and in physical contact with battery cover 36 and lower battery 150 when battery cover 36 is closed, but is free to move outwardly, e.g., away from battery cavity 116, when battery cover 36 is open. Member 36M is urged by battery cover 36 to bear, e.g., laterally, against the side of lower battery 150, to which side electrical connection to battery 150 may be made, thereby to bias and preferably press the side of lower battery 150 against circuit structure 140, e.g., against circuit board 142 thereof, for making electrical contact with an electrical conductor thereon.

Thus, battery 150 is biased laterally by movable member 36M to be in electrical contact with circuit board 142 and the circuitry thereon, thereby to complete the connections of batteries 150 in the circuitry of light 10. In one example embodiment, movable member 36M includes a loop through which hinge pin 36H passes so that battery cover 36 and member 36M are both pivotable about hinge pin 36H for providing the desired urging and biasing of lower battery 150 against circuit board 142.

Circuit structure 140 is positioned in module housing 110 rearward of light sources 120, 130 proximate battery cavity 116. A main circuit board 142 includes control circuitry for operating light sources 120, 130 and the left side electrical switch 146L in proper position so as to be adjacent to actuator opening 34A of left outer housing side 34. Circuit board 142 supports an extender circuit board 144, e.g., generally perpendicular thereto. Circuit board 144 provides electrical connection to switch circuit board 146C which supports right side electrical switch 146R in proper position so as to be adjacent to actuator opening 32A of right outer housing side 32, and may also include a portion of the control circuitry.

Each of electrical switches 146 preferably includes a metal dome switch element 136D that is adjacent to an electrical conductor pattern on circuit board 142 or 146 to which it makes electrical contact when depressed, e.g., via actuator openings 14R, 14L of outer housing 30. Typically, a flexible cover or boot is provided over each metal dome switch element, e.g., to retain it in position relative to circuit board 142 or 146. Circuit board 142 preferably supports one or more electrical contacts 148, which preferably include one or more helical electrically conductive springs for making electrical connection to a battery 150 in the battery cavity 116 of the light module 100.

Figure 5:
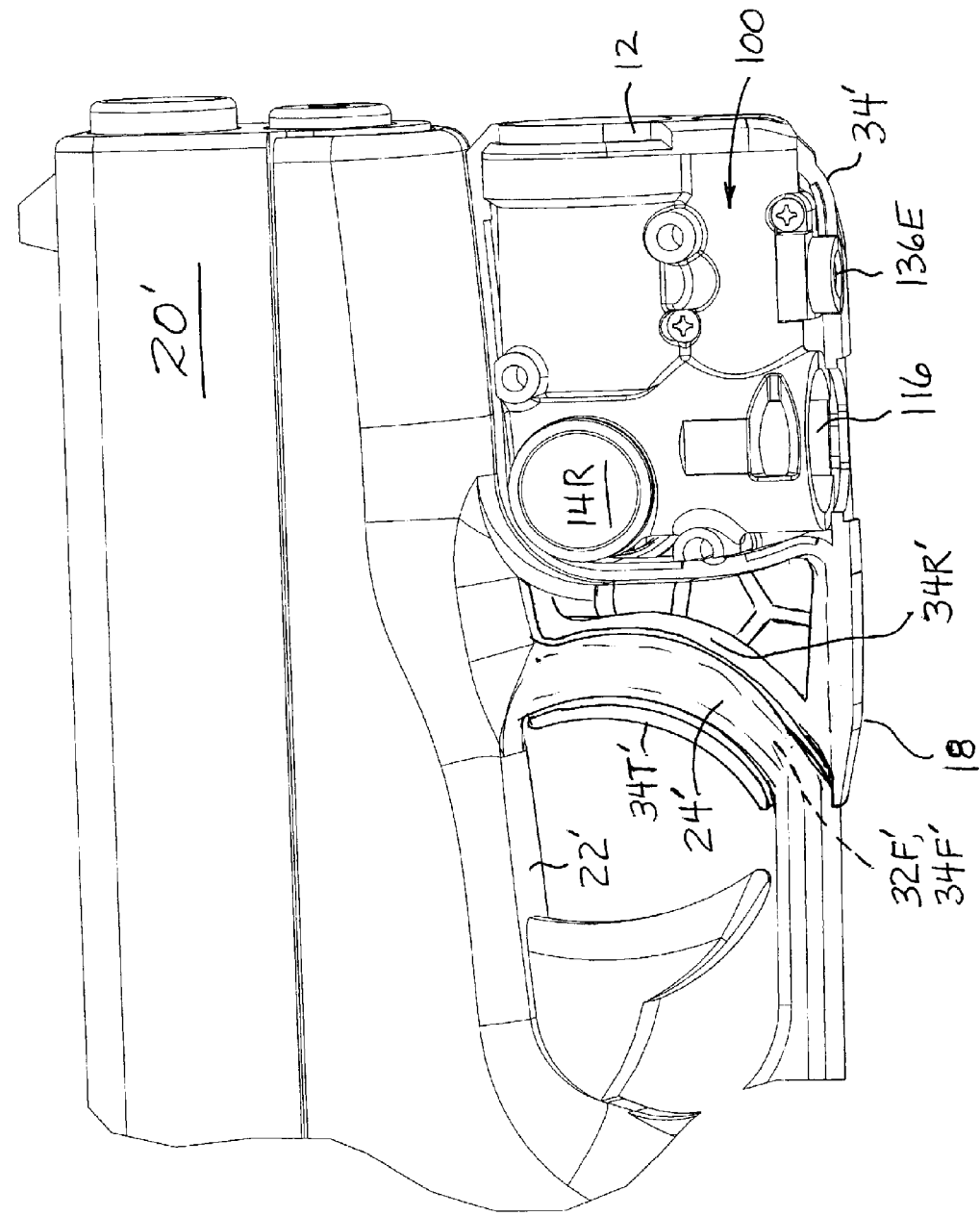
FIG. 5 is a side view of the interior side of one part of the outer light housing for use with a different handgun than is the light of FIGS. 1 and 2.

FIG. 5 is a view of the interior side of one part, e.g., left side 34', of an example outer light housing 30' for use with a different handgun 20' than is the housing 30 of light 10 of FIGS. 1 and 2. The particular example outer light housings 30 and 30' differ only in the shape and size of the cavity 32F, 34F and 32F', 34F' that are configured to correspond to the size and shape of a part of the frame 22 of the handgun 20, 20', e.g., the respective trigger guards 24, 24' thereof.

Both of sides 34, 34' are configured identically for receiving and supporting light module 100 therein and for being attached together by fasteners 38. They differ only with respect to their barrel-shaped recesses 16, 16' and their respective frame cavities 34, 34' because each barrel-shaped recess 16, 16' and each frame cavity 34, 34' is configured for receiving a particular part of a particular handgun, e.g., a particular barrel shape and part of a particular frame 22, 22' thereof.

As can be seen in, e.g., FIG. 2, the frame cavity 32F, 34F into which trigger guard 24 of frame 22 fits, are defined respectively by backing member 32T and rearward portion 32R of right housing side 32 of housings 32, and by backing member 34T and rearward portion 34R of housing 34, respectively. Frame cavity 32F, 34F is substantially wider at the transition thereof between the portion receiving the bottom horizontal part of trigger guard 24 and the portion thereof receiving the forward vertical part of trigger guard 24, so as to conform to the shape of trigger guard 24 which has a curved forward part and a forward projection at the bottom thereof.

In comparison, as can be seen in FIG. 5, frame cavity 32F', 34F' thereof is substantially uniform in width and is curved so as to conform to the size and shape of the curved part of trigger guard 24'. Backing member 34T' and rearward member 34R' of housing side 34' in this embodiment have a curvature and shape to define a frame cavity 32F', 34F' that corresponds to the size and shape of the portion of frame 22' of handgun 20', e.g., the trigger guard 24' thereof, so as to firmly retain trigger guard 24' therebetween in frame cavity 32F', 34F'. Corresponding parts 32T', 32T' of housing side 32' are substantially a mirror image of those illustrated in FIG. 5 regarding housing side 34'.

Figure 6:
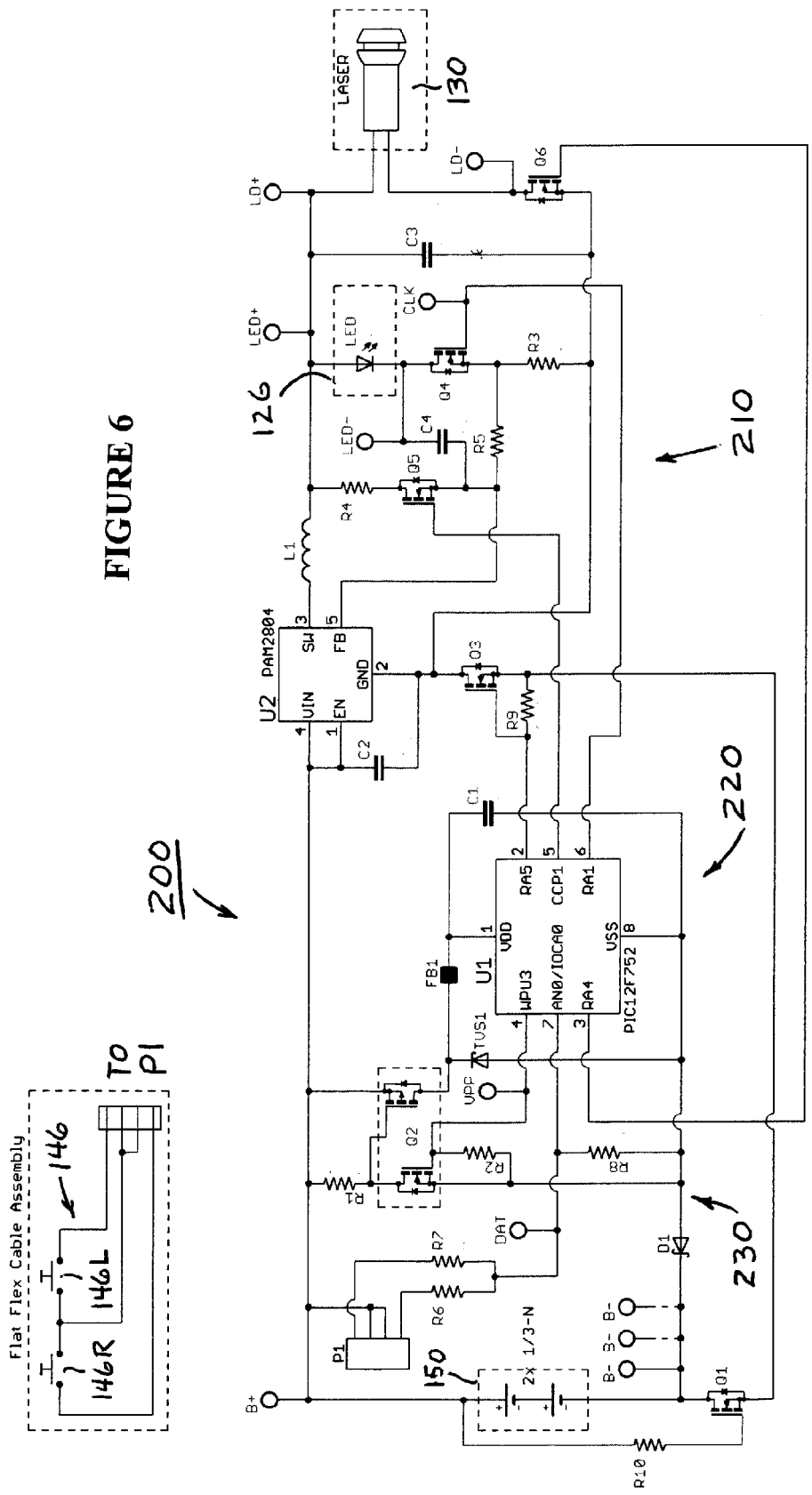
FIG. 6 is a schematic diagram of an electrical circuit for a portable light.

FIG. 6 is a schematic diagram of an electrical circuit 200 for a portable light 10 or for another portable light. Circuit 200 includes a DC converter 210, a controller 220 and a standby power reduction circuit 230. DC converter 210 includes integrated power control circuit U2, inductor L1 and capacitor C2 and is configured to convert, e.g., to reduce, the voltage provided by battery 150 to a voltage suitable for operating light source (LED) 126, laser 130 or both. The operating state of DC converter 210, and thereby of LED 126 and/or laser 130 as being powered or unpowered, is controlled by microprocessor U1 in response to user signals provided via a switch 146, e.g., left and right side switches 146L and 146R of handgun light 10.

Operation of LED 126 is enabled by field effect transistor (FET) Q4 being turned on under the control of microprocessor U1, sometimes referred to as a micro-controller, to provide a predetermined level of current flowing through LED 126, which current is sensed by current sensing resistor R3 to provide feedback via resistor R5 for controlling power control circuit U2 to produce a voltage Vo at the output of DC converter 210 that varies as needed to cause the desired predetermined current to flow through LED 126. LED 126 may be operated at different predetermined levels of current so as to provide light at different levels of brightness, e.g., dimmed, undimmed, flashing and the like.

Operation of laser 130 is enabled by FETs Q5 and Q6 being turned on under the control of microprocessor U1 (with Q4 being off) thereby to connect laser 130 across the output of DC converter 210 and to connect resistor R4 whereby resistors R4, R5 and R6 are configured as a voltage divider to sense the output voltage Vo thereof to provide a predetermined voltage, e.g., about 3.2 volts DC, across laser 130. Preferably laser 130 is, e.g., an integral unit that includes a laser light source, e.g., a laser diode, and the control circuitry necessary to operate the laser diode when a suitable input voltage, e.g., voltage Vo, is applied thereto.

Controller 220 operates responsive to the actuation of electrical switch 146, e.g., left and right side electrical switches 146L and 146R in the case of handgun light 10, via resistors R6, R7 and R8 to signal a desired operating state or condition for LED 126 and laser 130. Electrical switches 146, 146L and 146R are preferably momentary switches the closure and/or opening of which signal a desired operating condition to microprocessor U1 which appropriately enables one or more of FETS Q4-Q6, which are preferably operated as electrical switches being either on (conductive) or off (non-conductive), to apply and remove electrical power from LED 126 and/or laser 130. Either or both of switches 146L, 146R may be actuated to signal processor U1 to operate LED 126 and/or laser 130 in momentarily on, continuously on, continuously off, and other states.

If both LED 126 and laser 130 are to be powered on, DC converter 210 provides a predetermined operating voltage Vo for laser 130 and FET Q4 may be operated in a linear mode under the control of processor U1 so that a predetermined current flows through LED 126. In another example, DC converter 210 provides a predetermined operating voltage Vo, e.g., a voltage of about 2.8-3.0 VDC, to operate both LED 126 and laser 130 that is suitable for operating both LED 126 and laser 130.

Switches 146, 146L, 146R may be actuated in a sequence or manner, e.g., a number of closures within a given period of time and/or a continuous closure for a given period of time, or a combination thereof, to signal processor U1 to operate LED 126 and laser 130 in various operating modes, e.g., dimmed, undimmed, flashing, blinking, and/or strobed operation, and/or to otherwise program micro-controller U1. Further, both of switches 146L and 146R may be actuated at the same time to set or program micro-controller U1 to operate LED 126 and/or laser 130 in a particular operating mode or modes that is or are retained in a memory of micro-controller U1 when circuit 200 is turned off.

The common connection between switches 146L, 146R is connected to battery positive B+ via one contact of mated connectors P1 and the other contacts switches 146L, 146R are separately connected to resistors R6, R7, respectively, via separate contacts of mated connectors P1 which provide physical connections with circuit 200. It is noted that in all of the foregoing operating states, FETs Q1-Q3 which are operated as electrical switches being either on or off, are turned on so that U1 and U2 are connected to the source of electrical power, e.g., to battery 150. Connector P1 provides a convenient way to facilitate assembly, e.g., of module 100, with connector P1 being mounted to circuit board 142 and the mating part of connector P1 being provided by contacts near the edge of a flexible substrate 144-146 that is configured to be formed to provide extender circuit board 144 and left and right switch base circuit boards 146C in a single assembly that can be formed and installed in module 100.

However, even when both LED 126 and laser 130 are in the off state and thus do not consume power, both microprocessor U1 and power controller U2 in a conventional arrangement would be connected to battery 150 and would draw standby power therefrom, which would over a period of time drain battery 150.

To reduce, and preferably to avoid, such battery drain, lighting circuit 200 preferably includes a standby power reduction circuit 230 that includes, e.g., field effect transistors Q2 and Q3 and their associated components. So that the connection of control processor U1 and DC converter U2 to battery 150 can be rendered open, a series electronic switch is provided in either the positive voltage supply or in the negative voltage supply to ICs U1 and U2. In the illustrated example embodiment, field effect transistors, e.g., FETS Q1 and Q2, provide such electronic switch function and when turned off, reduce the standby power essentially to zero.

FET Q2 is connected in series between the positive battery terminal B+ and the positive voltage connection VDD of control processor U1 to control the application of battery voltage, e.g., received between terminals B+ and B−, to control processor U1. FET Q3 is connected in series between the negative battery terminal B− and the negative voltage connection GND to DC converter IC U2 to control the application of battery voltage to DC converter IC U2. FET Q2 includes an n-channel FET (n-FET) to the left and a p-channel FET (p-FET) to the right as drawn in FIG. 6. The negative voltage connection VSS to control processor U1 is connected via diode D1, e.g., a Schottky diode, to the negative battery terminal B− and the positive voltage connection VIN of DC converter IC U2 is directly connected to the positive battery terminal B+.

FET Q1 is provided to protect lighting circuit 200 from reverse polarity should battery 150 be improperly installed in light 10. FET Q1 is connected with its controllable conduction path (channel) in series with battery 150 at its negative B− terminal with the control electrode, e.g., gate electrode, of FET Q1 connected to the battery positive B+ terminal via resistor R10 so that FET Q1 is conductive (on) with a very low voltage drop when battery 150 is present with the correct polarity and is non-conductive (off) if battery 150 were to be present with the incorrect (reverse) polarity, e.g., were to be installed backwards in the battery cavity or receptacle.

Operation of electrical lighting circuit 200 including the standby power reducing circuit 230 thereof will now be described beginning with circuit 200 being in an unpowered condition, e.g., as is the case immediately after a battery 150 is received or after circuit 200 has been turned off. FETS Q2 (both the n-FET and the p-FET thereof) and Q3 are then biased to an off or non-conductive (open) condition by the resistors R1, R2 and R9, respectively, which are connected between their respective gate (control) electrodes and source (channel) electrodes.

When either or both of electrical switches 146, 146L, 146R are actuated to close the contacts thereof, battery voltage V+ is applied via resistors R6 and/or R7 to provide operating power to turn on control microprocessor U1 (e.g., pin 7, AN0/IOCA0, is internally connected to positive power pin 1, VDD, by a diode internal to U1) which in turn applies voltage to the control electrode (gate electrode) of n-FET Q2 to render the controllable conduction paths (channels) of both n-FET Q2 and p-FET Q2 conductive, thereby to apply battery voltage B+ to pin VDD of microprocessor U1 to latch microprocessor U1 in the powered or on condition.

At substantially the same time, microprocessor U1 also applies voltage to the control electrode (gate) of FET Q3 to render its controllable conduction path (channel) conductive to turn FET Q3 on thereby to connect the GND terminal of DC converter U2 to negative battery terminal B−, whereby DC converter U2 is connected across battery terminals B+ and B− and receives battery power therefrom to operate as a DC converter 210 as described.

When the, e.g., normally open contacts of electrical switches 146, 146L, 146R thereafter open, microprocessor U1 is programmed to maintain the voltages supplied to the gates of FETS Q2 and Q3 so that both microprocessor U1 and DC converter U2 remain powered on and operating to power LED 126 and/or laser 130. Thereafter, the closing and/or opening of momentary electrical switches 146, 146L, 146R provide signals via resistor divider R6, R7, R8 to microprocessor U1 for changing the operating condition of light 10. Preferably, controller U1 may be programmed to turn circuit 200 off in the absence of a signal from switch 146, 146L, 146R for a predetermined period of time, e.g., 10 minutes, thereby to prevent accidental discharge of battery 150, e.g., should a user fail to turn the light off.

In this operating condition, resistors R6, R7, R8 provide a voltage divider that provides predetermined voltages to control processor U1 in response to the closing and/or opening of the, e.g., normally open, contacts of switch 146, 146L, 146R to command and/or program processor U1 to operate lighting circuit 200 in an operating mode represented by the sequence and/or timing of the closing and/or opening of the contacts of switches 146, 146L, 146R.

Capacitors C1, C2 provide filtering of the voltage provided by battery 150 at electronic devices U1 and U2 and further tend to maintain suitable operating voltage for processor U1 and DC converter U2 during certain operations, e.g., to maintain sufficient voltage for controller U1 to resist disruption to operation due to a momentary loss of battery 150 voltage, e.g., when circuit 200 is employed in a handgun light 10 and the weapon to which it is attached is discharged. Further, if controller U1 were not to be programmed to complete a turn off sequence before removing the control voltages keeping FETs Q2, Q3, conductive, then capacitor C1 may also provide a continuing voltage to assist completion of the programmed turn off sequencing, e.g., of DC converter U2, of FETs Q2 and Q3, and of controller U1.

When the signals so provided to microprocessor U1 via the closing and/or opening of momentary electrical switches 146, 146L, 146R indicate that the selected operating mode is to be the off mode, upon the opening of the contact(s) thereof microprocessor U1 removes the voltage it had been providing to the gates of FETS Q2 and Q3 that was maintaining FETS Q2, Q3 of standby power reducing circuit 230 in their conductive or on condition so that FETS Q2, Q3 then become non-conductive. And so FETS Q2 and Q3 are turned off to remove battery power (e.g., they interrupt the connections of U1 and U2 to battery 150) from both control processor U1 and DC converter U2, thereby to place lighting circuit 200 into its standby mode, while sufficient voltage over the short time needed to complete that operation is provided by capacitor C1. In this off mode or condition, FETS Q2 and Q3 being non-conductive prevents lighting circuit 200 from drawing significant standby power from battery 150, whereby battery 150 can remain charged without lighting circuit 200 reducing the duration of its shelf life.

In a typical embodiment, housings 30 and 110 are of any suitable plastic or metal material, e.g., preferably a molded plastic such as a nylon, engineered nylon, polycarbonate, polyethylene, a PC/PET plastic blend, ABS plastic, with or without a reinforcing material such as a fiberglass, carbon fiber or the like, or any other suitable plastic or other moldable material. Outer housing 30, in particular, or parts thereof, e.g., battery cover 36, may be made from an aluminum, brass, beryllium copper, stainless steel, or other metal, e.g., where the strength and/or electrical conductivity provided thereby, and/or the look thereof, is considered necessary or desirable. Movable member 36H may be of one of the foregoing plastic materials or of a resilient polymer, elastomer or other plastic material, e.g., a urethane, silicone, rubber, synthetic rubber, or the like, and may be over-molded onto a loop of a metal or other suitable material. By way of further example, some or all of the inner surfaces of housing sides 32, 34 that define frame cavity 32F, 34F may be of one of the foregoing polymer, elastomer or other resilient plastic materials, thereby to increase friction between frame 22 of handgun 20 and housing 30 of light 10 for better retaining light 10 in a desired position relative to handgun 20.

In one typical embodiment, light 10 is about 2.3 inches (about 5.8 cm) in length, about 0.85 inches (about 2.2 cm) in width, and about 1.5 inches (about 3.8 cm) in height, and light module 100 is about 1.5 inches (about 3.8 cm) in length, about 0.8 inches (about 2.0 cm) in width, and about 1.2 inches (about 3.0 cm) in height.

In one example embodiment of lighting circuit 200, microprocessor U1 is a type PIC12F752 device which is an 8-bit micro-controller that is commercially available from Microchip Technology, Inc. located in Chandler, Ariz., and DC converter U2 is a type PAM2804 device which is a step down LED driver that is commercially available from Diodes Incorporated located in Dallas (Plano), Texas.

Other examples of electrical and/or control circuitry suitable for use in an example embodiment of a light 10 are described, e.g., in U.S. Pat. No. 7,466,082 entitled "ELECTRONIC CIRCUIT REDUCING AND BOOSTING VOLTAGE FOR CONTROLLING LED CURRENT," in U.S. Pat. No. 8,662,701 entitled "FLASHLIGHT HAVING A CONTROLLER PROVIDING PROGRAMMABLE OPERATING STATES," in U.S. Pat. No. 8,258,416 entitled "ELECTRICAL SWITCH AND FLASHLIGHT," and in U.S. Pat. No. 8,779,683 entitled "LIGHT HAVING A CIRCUIT ACCOMMODATING BATTERIES OF DIFFERENT TYPES AND/OR SIZES," each of which is assigned to Streamlight, Incorporated, located in Eagleville, Pa., and is hereby incorporated herein by reference in its entirety, for any purpose.

A light 10 mountable on a handgun 20 may comprise: a light module 100 including in a light module housing 110 one or more light sources 120, 130, a cavity for receiving a source of electrical power 150, at least one electrical switch 146, and a control circuit for selectively energizing the one or more light sources 120, 130; an outer light housing 30 having first and second complementary housing parts 32, 34 enclosing the light module 100, the first and second complementary housing parts 32, 34 cooperating when together to define at a first end of the outer light housing 30 a cavity configured to correspond to the size and shape of a part of the handgun; whereby the light 10 is mountable to the part of the handgun when the first and second complementary housing parts 32, 34 of the outer light housing 30 are attached together with the part of the handgun in the cavity thereof; the outer light housing 30 having one or more openings at a second end thereof through which light produced by the one or more light sources 120, 130 may be emitted; the outer light housing 30 having an opening through which the at least one electrical switch 146 of the light module 100 is actuatable from outside the outer light housing 30; and the outer light housing 30 including an access cover 36 on an exterior surface thereof that is not adjacent the handgun, the access cover 36 being openable when the light 10 is mounted on a handgun for placing a source of electrical power 150 into the light module housing 110 and for removing the source of electrical power 150 from the light module housing 110. The one or more light sources 120, 130 of the light module 100 may include: an illumination light source 120, or a laser aiming light source 130; or an illumination light source 120 and a laser aiming light source 130. The first and second complementary housing parts 32, 34 of the outer light housing 30 may be attached together by one or more threaded fasteners 38, wherein tightening the one or more threaded fasteners 38 clamps the part of the handgun in the cavity therefor defined by the first and second complementary housing parts 32, 34. The part of the handgun for which the cavity of the outer light housing 30 is configured may include a trigger guard 24. The access cover 36 may be closable to retain the source of electrical power 150 in the light module housing 110; or the access cover 36 may be pivotably attached to one of the first and second complementary housing parts 32, 34 of the outer light housing 30; or the access cover 36 may be closable to retain the source of electrical power 150 in the light module housing 110 and may be pivotably attached to one of the first and second complementary housing parts 32, 34 of the outer light housing 30. The light 10 mountable on a handgun may further comprise a movable member 36M disposed between the access cover 36 and a side of the source of electrical power 150, wherein the movable member 36M biases the source of electrical power 150 against a surface of the light module 100. The movable member 36M may bias the source of electrical power 150 against an electrical contact of the light module 100 so that the side of the source of electrical power 150 makes an electrical connection to the electrical contact, e.g., of a circuit structure. The light 10 mountable on a handgun may be in combination with at least a second outer light housing 30' having first and second complementary housing parts 32', 34' for enclosing the light module 100, the first and second complementary housing parts 32', 34' of the second outer light housing 30' cooperating when together to define at a first end of the outer light housing 30 a cavity configured to correspond to the size and shape of a part of a different handgun than does the outer light housing 30. The light module 100 may include an azimuth adjusting screw 136A and an elevation adjusting screw 136E for aiming the laser light source 130 in azimuth and elevation, respectively, and the outer light housing 30 may have one or more openings 136 through which the azimuth adjusting screw 136A and the elevation adjusting screw 136E can be adjusted. The control circuit 200 may comprise: a control processor 220 having a control input for receiving a signal, having a first control output, having a second control output for selectively energizing the one or more light sources 120, 130, and having first and second power terminals VDD, VSS at which electrical power to operate the control processor 220 is received; at least one electrical switch contact 146, 146L, 146R of the at least one electrical switch 146, 146L, 146R of the light module 100 selectively connecting one of first and second terminals B+, B− of the source of electrical power 150 to the control input of the control processor 220 to cause the control processor 220 to selectively energize the one or more light sources 120, 130; a first controllable electronic device Q2 having a controllable conduction path connected between the first terminal B+, B− and the first power terminal VDD, VSS of the control processor 220, and having a control electrode coupled to the first control output of the control processor 220; wherein when electrical power is received from the source of electrical power 150 at the first and second terminals B+, B−, the control processor 220 is responsive to a closure or to an opening or to both a closure and an opening of the at least one electrical switch contact 146, 146L, 146R to provide a control voltage at the first control output that is coupled to the control electrode of the first controllable electronic device Q2 to maintain the first controllable electronic device Q2 conductive, whereby the control processor 220 then remains in a powered condition; and wherein the control processor 220 is responsive to a subsequent closure or to a subsequent opening or both a subsequent closure and a subsequent opening of the at least one electrical switch contact 146, 146L, 146R to remove the control voltage at the first control output that is coupled to the control electrode of the first controllable electronic device Q2 to render the first controllable electronic device Q2 nonconductive, whereby the control processor 220 is then in an unpowered condition even when electrical power is received at the first and second terminals B+, B−.

A light 10 mountable on a handgun 20 may comprise: a light module 100 including in a light module housing 110, an illumination light source 120 and a laser aiming light source 130, a cavity for receiving a source of electrical power 150, at least one electrical switch 146, and a control circuit for selectively energizing the illumination light source 120 and the laser aiming light source 130; an outer light housing 30 having first and second complementary housing parts 32, 34 enclosing the light module 100, the first and second complementary housing parts 32, 34 cooperating when together to define at a first end of the outer light housing 30 a cavity configured to correspond to the size and shape of a part of the handgun; whereby the light 10 is mountable to the part of the handgun when the first and second complementary housing parts 32, 34 of the outer light housing 30 are attached together with the part of the handgun in the cavity thereof; the outer light housing 30 having one or more openings 12 at a second end thereof through which light produced by the illumination light source 120 and the laser aiming light source 130 may be emitted; and the outer light housing 30 having an 32A, 34A through which the at least one electrical switch 146 of the light module 100 is actuatable from outside the outer light housing 30. The outer light housing 30 may include an access cover 36 on an exterior surface thereof that is not adjacent the handgun, the access cover 36 being openable when the light is mounted on a handgun for placing a source of electrical power 150 into the light module housing 110 and for removing the source of electrical power 150 from the light module housing 110. The access cover 36 may be closable to retain the source of electrical power 150 in the light module housing 110; or the access cover 36 may be pivotably attached to one of the first and second complementary housing parts 32, 34 of the outer light housing 30; or the access cover 36 may be closable to retain the source of electrical power 150 in the light module housing 110 and may be pivotably attached to one of the first and second complementary housing parts 32, 34 of the outer light housing 30. The light 10 mountable on a handgun may further comprise a movable member 36M disposed between the access cover 36 and a side of the source of electrical power 150, wherein the movable member 36M biases the source of electrical power 150 against a surface of the light module 100. The movable member 36M may bias the source of electrical power 150 against an electrical contact of the light module 100 so that the side of the source of electrical power 150 makes an electrical connection to the electrical contact. The first and second complementary housing parts 32, 34 of the outer light housing 30 may be attached together by one or more threaded fasteners 38, wherein tightening the one or more threaded fasteners 38 clamps the part of the handgun in the cavity therefor defined by the first and second complementary housing parts 32, 34. The part of the handgun for which the cavity of the outer light housing 30 is configured may include a trigger guard. The light 10 mountable on a handgun may be in combination with at least a second outer light housing 30' having first and second complementary housing parts 32', 34' for enclosing the light module 100, the first and second complementary housing parts 32', 34' of the second outer light housing 30' cooperating when together to define at a first end of the outer light housing 30 a cavity configured to correspond to the size and shape of a part of a different handgun than does the outer light housing 30 of claim 1. The light module 100 may include an azimuth adjusting screw 136A and an elevation adjusting screw 136E for aiming the laser light source 130 in azimuth and elevation, respectively, and the outer light housing 30 may have one or more openings 136 through which an azimuth adjusting screw 136A and the elevation adjusting screw 136E can be adjusted. The control circuit 200 may comprise: a control processor 220 having a control input for receiving a signal, having a first control output, having a second control output for selectively energizing the illumination light source 120 and the laser aiming light source 130, and having first and second power terminals VDD, VSS at which electrical power to operate the control processor 220 is received; at least one electrical switch contact 146, 146L, 146R of the at least one electrical switch 146, 146L, 146R of the light module 100 selectively connecting one of first and second terminals B+, B− of the source of electrical power 150 to the control input of the control processor 220 to cause the control processor 220 to selectively energize the illumination light source 120 and the laser aiming light source 130; a first controllable electronic device Q2 having a controllable conduction path connected between the first terminal B+, B− and the first power terminal VDD, VSS of the control processor 220, and having a control electrode coupled to the first control output of the control processor 220; wherein when electrical power is received from the source of electrical power 150 at the first and second terminals B+, B−, the control processor 220 is responsive to a closure or to an opening or to both a closure and an opening of the at least one electrical switch contact 146, 146L, 146R to provide a control voltage at the first control output that is coupled to the control electrode of the first controllable electronic device Q2 to maintain the first controllable electronic device Q2 conductive, whereby the control processor 220 then remains in a powered condition; and wherein the control processor 220 is responsive to a subsequent closure or to a subsequent opening or both a subsequent closure and a subsequent opening of the at least one electrical switch contact 146, 146L, 146R to remove the control voltage at the first control output that is coupled to the control electrode of the first controllable electronic device Q2 to render the first controllable electronic device Q2 nonconductive, whereby the control processor 220 is then in an unpowered condition even when electrical power is received at the first and second terminals B+, B−.

A light 10 mountable on a handgun may comprise: a light module 100 including in a light module housing 110 an illumination light source 120 and a laser aiming light source 120, a cavity for receiving a source of electrical power 150, at least one electrical switch 146, and a control circuit for selectively energizing the illumination light source 120 and the laser aiming light source 130; an outer light housing 30 having first and second complementary housing parts 32, 34 enclosing the light module 100, the first and second complementary housing parts 32, 34 cooperating when together to define at a first end of the outer light housing 30 a cavity configured to correspond to the size and shape of a trigger guard of the handgun; whereby the light 10 is mountable to the trigger guard of the handgun when the first and second complementary housing parts 32, 34 of the outer light housing 30 are attached together with the trigger guard of the handgun in the cavity thereof and the light module 100 therein; the outer light housing 30 having one or more openings 12 at a second end thereof through which light produced by the illumination light source 120 and the laser aiming light source 130 may be emitted; the outer light housing 30 having an opening 32A, 34A through which the at least one electrical switch 146 of the light module 100 is actuatable from outside the outer light housing 30; and the outer light housing 30 including an access cover 36 on an exterior surface thereof that is not adjacent the handgun, the access cover 36 being openable when the light 10 is mounted on a handgun for placing a source of electrical power 150 into the light module housing 110 and for removing the source of electrical power 150 from the light module housing 110. The access cover 36 may be closable to retain the source of electrical power 150 in the light module housing 110; or the access cover 36 may be pivotably attached to one of the first and second complementary housing parts 32, 34 of the outer light housing 30; or the access cover 36 may be closable to retain the source of electrical power 150 in the light module housing 110 and may be pivotably attached to one of the first and second complementary housing parts 32, 34 of the outer light housing 30. The light 10 mountable on a handgun may further comprise a movable member 36M disposed between the access cover 36 and a side of the source of electrical power 150, wherein the movable member 36M biases the source of electrical power 150 against a surface of the light module 100. The movable member 36M may bias the source of electrical power 150 against an electrical contact of the light module 100 so that the side of the source of electrical power 150 makes an electrical connection to the electrical contact. The first and second complementary housing parts 32, 34 of the outer light housing 30 may be attached together by one or more threaded fasteners 38, wherein tightening the one or more threaded fasteners 38 clamps the trigger guard of the handgun in the cavity therefor defined by the first and second complementary housing parts 32, 34. The light 10 mountable on a handgun may be in combination with at least a second outer light housing 30' having first and second complementary housing parts 32', 34' for enclosing the light module 100, the first and second complementary housing parts 32', 34' of the second outer light housing 30' cooperating when together to define at a first end of the outer light housing 30' a cavity configured to correspond to the size and shape of a trigger guard of a different handgun than does the outer light housing 30. The light module 100 may include an azimuth adjusting screw 136A and an elevation adjusting screw 136E for aiming the laser light source 130 in azimuth and elevation, respectively, the outer light housing 30 having one or more openings through which an azimuth adjusting screw 136A and the elevation adjusting screw 136E can be adjusted. The control circuit 200 may comprise: a control processor 220 having a control input for receiving a signal, having a first control output, having a second control output for selectively energizing the illumination light source 120 and the laser aiming light source 130, and having first and second power terminals VDD, VSS at which electrical power to operate the control processor 220 is received; at least one electrical switch contact 146, 146L, 146R of the at least one electrical switch 146, 146L, 146R of the light module 100 selectively connecting one of first and second terminals B+, B− of the source of electrical power 150 to the control input of the control processor 220 to cause the control processor 220 to selectively energize the illumination light source 120 and the laser aiming light source 130; a first controllable electronic device Q2 having a controllable conduction path connected between the first terminal B+, B− and the first power terminal VDD, VSS of the control processor 220, and having a control electrode coupled to the first control output of the control processor 220; wherein when electrical power is received from the source of electrical power 150 at the first and second terminals B+, B−, the control processor 220 is responsive to a closure or to an opening or to both a closure and an opening of the at least one electrical switch contact 146, 146L, 146R to provide a control voltage at the first control output that is coupled to the control electrode of the first controllable electronic device Q2 to maintain the first controllable electronic device Q2 conductive, whereby the control processor 220 then remains in a powered condition; and wherein the control processor 220 is responsive to a subsequent closure or to a subsequent opening or both a subsequent closure and a subsequent opening of the at least one electrical switch contact 146, 146L, 146R to remove the control voltage at the first control output that is coupled to the control electrode of the first controllable electronic device Q2 to render the first controllable electronic device Q2 nonconductive, whereby the control processor 220 is then in an unpowered condition even when electrical power is received at the first and second terminals B+, B−.

A lighting circuit 200 for a portable light may comprise: first and second terminals B+, B− at which electrical power is received; a light source 120, 130 selectively energizable by electrical power received at the first and second terminals B+, B−; a control processor 220 having a control input for receiving a signal, having a first control output, having a second control output for selectively energizing the light source 120, 130, and having first and second power terminals VDD, VSS at which electrical power to operate the control processor 220 is received; at least one electrical switch contact 146, 146L, 146R selectively connecting one of the first and second terminals B+, B− to the control input of the control processor 220 to cause the control processor to selectively energize the light source 120, 130; a first controllable electronic device Q2 having a controllable conduction path connected between the first terminal B+, B− and the first power terminal VDD, VSS of the control processor 220, and having a control electrode coupled to the first control output of the control processor 220; wherein when electrical power is received at the first and second terminals B+, B−, the control processor 220 is responsive to a closure or to an opening or to both a closure and an opening of the at least one electrical switch contact 146, 146L, 146R to provide a control voltage at the first control output that is coupled to the control electrode of the first controllable electronic device Q2 to maintain the first controllable electronic device Q2 conductive, whereby the control processor 220 then remains in a powered condition; and wherein the control processor 220 is responsive to a subsequent closure or to a subsequent opening or both a subsequent closure and a subsequent opening of the at least one electrical switch contact 146, 146L, 146R to remove the control voltage at the first control output that is coupled to the control electrode of the first controllable electronic device Q2 to render the first controllable electronic device Q2 nonconductive, whereby the control processor 220 is then in an unpowered condition even when electrical power is received at the first and second terminals B+, B−. The lighting circuit 200 may further comprise a DC converter 210 coupled to the first and second terminals B+, B− for converting electrical power received thereat for energizing the light source 120, 130. The lighting circuit 200 may further comprise: a second controllable electronic device Q3 having a controllable conduction path connected between one of the first and second terminals B+, B− and the DC converter 210, and having a control electrode coupled to a second control output of the control processor 220; wherein the second control output provides a signal to maintain the second controllable electronic device Q3 conductive when the first controllable electronic device Q2 is conductive and to maintain the second controllable electronic device Q3 nonconductive when the first controllable electronic device Q2 is nonconductive, whereby the control processor 220 and the DC converter 210 are then in an unpowered condition even when electrical power is received at the first and second terminals B+, B−. The second controllable electronic device Q3 may include a field effect transistor Q3 having the controllable conduction path between its source and drain electrodes and having the control electrode at its gate electrode. The light source 120, 130 may include a light emitting diode 126, a laser 130, or both a light emitting diode 126 and a laser 130, coupled to be energized by the DC converter 210. The light source 120, 130 may include a light emitting diode 126 and a laser 130; and the DC converter 210 may have a control input coupled to a third control output of the control processor 220 to control the output of the DC converter 210 to selectively energize the light emitting diode 126, the laser 130, or both the light emitting diode 126 and the laser 130. The light source 120, 130 may include a light emitting diode 126, a laser 130, or both a light emitting diode 126 and a laser 130. The DC converter 210 may provide a predetermined current to the light emitting diode 126 and a predetermined voltage to the laser 130. The first controllable electronic device Q2 may include a field effect transistor Q2 having the controllable conduction path between its source and drain electrodes and having the control electrode at its gate electrode. The lighting circuit 200 may further comprise: a light module 100 supporting at least one of the first and second terminals B+, B−, the light source 120, 130, the at least one electrical switch contact 146, 146L, 146R, the control processor 220 and the first controllable electronic device Q2, the light module 100 defining a cavity for receiving a source of electrical power 150 at the at least one of the first and second terminals B+, B−; and an outer light housing 30 including complementary housing parts 32, 34 enclosing the light module 100 and defining a cavity configured to receive a part of a handgun 20 and an opening through which the at least one electrical switch contact 146, 146L, 146R of the light module 100 is actuatable. The control processor 220, U1 may include a controller 220, U1.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "up," "down," "front," "rear," "side," "end," "top," "bottom," "forward," "backward," "under" and/or "over," "vertical," "horizontal," and the like may be used herein as a convenience in describing one or more embodiments and/or uses of the present arrangement, e.g., the position of light 10 when mounted to a handgun in a common position under the barrel thereof, the articles described may be positioned in any desired orientation and/or may be utilized in any desired position and/or orientation. Such terms of position and/or orientation should be understood as being for convenience only, and not as limiting of the invention as claimed.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable device. Other devices could include fuel cells, super capacitors, solar cells, and the like. Any of the foregoing may be intended for a single use or for being rechargeable or for both Various embodiments of a battery may have one or more battery cells, e.g., one, two, three, four, or five or more battery cells, as may be deemed suitable for any particular device. A battery may employ various types and kinds of battery chemistry types, e.g., a carbon-zinc, alkaline, lead acid, nickel-cadmium (Ni—Cd), nickel-metal-hydride (NiMH) or lithium-ion (Li-Ion) battery type, of a suitable number of cells and cell capacity for providing a desired operating time and/or lifetime for a particular device, and may be intended for a single use or for being rechargeable or for both. Examples may include a three or six cell lead acid battery typically producing about 6 volts or about 12 volts, a three cell Ni—Cd battery typically producing about 3.6 volts, a four cell NiMH battery typically producing about 4.8 volts, a five cell NiMH battery producing about 6 volts, a Li-Ion battery typically producing about 3.5 volts, or a two-cell Li-Ion battery typically producing about 7 volts, e.g., two ⅓ "N" cell lithium batteries, it being noted that the voltages produced thereby will be higher when approaching full charge and will be lower in discharge, particularly when providing higher current and when reaching a low level of charge, e.g., becoming discharged.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred is such instances. A fastener may also include, where appropriate, other forms of fastening such as a formed head, e.g., a peened or swaged or heat formed head, a weld, e.g., a heat weld or ultrasonic weld, a braze, and the like.

While the present invention has been described in terms of the foregoing example embodiments, variations within the scope and spirit of the present invention as defined by the claims following will be apparent to those skilled in the art. For example, while light 10 preferably includes both illumination light source 120 and aiming laser light source 130, in an embodiment for a particular application, light 10 could include either illumination light source 120 or aiming laser light source 130, but not both.

While illumination light source 120 is illustrated in an upper or over position and laser light source 130 in a lower or under position, these positions may be reversed, or may be made side-by-side, if desired. Similarly, while switch actuating buttons 14 are preferably provided on both the left and right sides of light 10, only one switch actuating button need be provided and it could be located in a position as or near as illustrated or could be in a different location.

Battery cover 36 may be made of an electrically conductive material so as to make electrical connection to the side or end of lower battery 150 with which it is in physical contact, or a separate electrical contact may be provided on a battery cover 36. In a further alternative, movable member 36M may be part of and/or attached to battery access cover 36, e.g., a raised part thereof or a resilient bump attached thereto, rather than a separate piece.

While the controllable electronic devices, e.g., FETs Q2 and Q3, are shown by way of example as being connected in series with the positive polarity of electrical power to control processor U1 and in series with the negative polarity of electrical power to DC converter U2, respectively, the controllable electronic device, e.g., FET, for either or both of U1 and U2 may be connected in series in either the positive or the negative power connection therefor, or in both the positive and negative polarity power connections therefor.

Further, while controllable electronic devices, e.g., FETs Q2 and Q3, are shown by way of example as being connected in series with a controller or processor U1 and in series with a DC converter U2, respectively, a standby power reduction circuit of the sort described herein may be used with any integrated circuit or non-integrated circuit elements in a lighting circuit, e.g., where a reduction of standby power is desired.

It is noted that the terms processor, microprocessor, control processor, controller, micro-controller, and the like are used interchangeably herein.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A light mountable on a handgun comprising:
   a light module including in a light module housing one or more light sources, a cavity for receiving a source of electrical power, at least one electrical switch, and a control circuit for selectively energizing said one or more light sources;
   an outer light housing having first and second complementary housing parts enclosing said light module, the first and second complementary housing parts cooperating when together to define at a first end of the outer light housing a cavity configured to correspond to the size and shape of a part of the handgun;
   whereby said light is mountable to the part of the handgun when the first and second complementary housing parts of the outer light housing are attached together with the part of the handgun in the cavity thereof;

said outer light housing having one or more openings at a second end thereof through which light produced by said one or more light sources may be emitted;

said outer light housing having an opening through which the at least one electrical switch of said light module is actuatable from outside said outer light housing;

said outer light housing including an access cover on an exterior surface thereof that is not adjacent the handgun, said access cover being openable when said light is mounted on a handgun for placing a source of electrical power into the light module housing and for removing the source of electrical power from the light module housing; and a movable member disposed between said access cover and a side of the source of electrical power, wherein said movable member biases the source of electrical power against said light module.

2. The light mountable on a handgun of claim 1 wherein the one or more light sources of said light module include:
an illumination light source, or
a laser aiming light source; or
an illumination light source and a laser aiming light source.

3. The light mountable on a handgun of claim 1 wherein the first and second complementary housing parts of said outer light housing are attached together by one or more threaded fasteners, wherein tightening the one or more threaded fasteners clamps the part of the handgun in the cavity therefor defined by said first and second complementary housing parts.

4. The light mountable on a handgun of claim 1 wherein the part of the handgun for which the cavity of said outer light housing is configured includes a trigger guard.

5. The light mountable on a handgun of claim 1 wherein;
said access cover is closable to retain the source of electrical power in said light module housing; or
said access cover is pivotably attached to one of the first and second complementary housing parts of said outer light housing; or
said access cover is closable to retain the source of electrical power in said light module housing and is pivotably attached to one of the first and second complementary housing parts of said outer light housing.

6. The light mountable on a handgun of claim 1 wherein said movable member biases the source of electrical power against an electrical contact of said light module so that the side of the source of electrical power makes an electrical connection to the electrical contact.

7. The light mountable on a handgun of claim 1 in combination with at least a second outer light housing having first and second complementary housing parts for enclosing said light module, the first and second complementary housing parts of said second outer light housing cooperating when together to define at a first end of the outer light housing a cavity configured to correspond to the size and shape of a part of a different handgun than does the outer light housing of claim 1.

8. The light mountable on a handgun of claim 1 wherein said light module includes an azimuth adjusting screw and an elevation adjusting screw for aiming said laser light source in azimuth and elevation, respectively, said outer light housing having one or more openings through which the azimuth adjusting screw and the elevation adjusting screw can be adjusted.

9. The light mountable on a handgun of claim 1 wherein the control circuit of said light module comprises:
a control processor having a control input for receiving a signal, having a first control output, having a second control output for selectively energizing said one or more light sources, and having first and second power terminals at which electrical power to operate said control processor is received;

at least one electrical switch contact of the at least one electrical switch of said light module selectively connecting one of first and second terminals at which electrical power is received from the source of electrical power to the control input of said control processor to cause said control processor to selectively energize said one or more light sources;

a first controllable electronic device having a controllable conduction path connected between said first terminal and the first power terminal of said control processor, and having a control electrode coupled to the first control output of said control processor;

wherein when electrical power from the source of electrical power is received at said first and second terminals, said control processor is responsive to a closure or to an opening or to both a closure and an opening of said at least one electrical switch contact to provide a control voltage at the first control output that is coupled to the control electrode of said first controllable electronic device to maintain said first controllable electronic device conductive, whereby said control processor then remains in a powered condition; and wherein said control processor is responsive to a subsequent closure or to a subsequent opening or both a subsequent closure and a subsequent opening of said at least one electrical switch contact to remove the control voltage at the first control output that is coupled to the control electrode of said first controllable electronic device to render said first controllable electronic device nonconductive, whereby said control processor is then in an unpowered condition even when electrical power is received at said first and second terminals.

10. A light mountable on a handgun comprising:
a light module including in a light module housing, an illumination light source and a laser aiming light source, a cavity for receiving a source of electrical power, at least one electrical switch, and a control circuit for selectively energizing said illumination light source and said laser aiming light source;

an outer light housing having first and second complementary housing parts enclosing said light module, the first and second complementary housing parts cooperating when together to define at a first end of the outer light housing a cavity configured to correspond to the size and shape of a part of the handgun;

whereby said light is mountable to the part of the handgun when the first and second complementary housing parts of the outer light housing are attached together with the part of the handgun in the cavity thereof;

said outer light housing having one or more openings at a second end thereof through which light produced by said illumination light source and said laser aiming light source may be emitted;

said outer light housing having an opening through which the at least one electrical switch of said light module is actuatable from outside said outer light housing;

an access cover on an exterior surface of said outer light housing that is not adjacent the handgun, said access cover being openable when said light is mounted on a handgun for placing a source of electrical power into the light module and for removing the source of electrical power from the light module; and a movable member disposed between said access cover and a side of the source of electrical power, wherein said movable member biases the source of electrical power against said light module.

11. The light mountable on a handgun of claim 10 wherein:
said access cover is closable to retain the source of electrical power in said light module housing; or
said access cover is pivotably attached to one of the first and second complementary housing parts of said outer light housing; or
said access cover is closable to retain the source of electrical power in said light module housing and is pivotably attached to one of the first and second complementary housing parts of said outer light housing.

12. The light mountable on a handgun of claim 10 wherein said movable member biases the source of electrical power against an electrical contact of said light module so that the side of the source of electrical power makes an electrical connection to the electrical contact.

13. The light mountable on a handgun of claim 10 wherein the first and second complementary housing parts of said outer light housing are attached together by one or more threaded fasteners, wherein tightening the one or more threaded fasteners clamps the part of the handgun in the cavity therefor defined by said first and second complementary housing parts.

14. The light mountable on a handgun of claim 10 wherein the part of the handgun for which the cavity of said outer light housing is configured includes a trigger guard.

15. The light mountable on a handgun of claim 10 in combination with at least a second outer light housing having first and second complementary housing parts for enclosing said light module, the first and second complementary housing parts of said second outer light housing cooperating when together to define at a first end of the outer light housing a cavity configured to correspond to the size and shape of a part of a different handgun than does the outer light housing of claim 10.

16. The light mountable on a handgun of claim 10 wherein said light module includes an azimuth adjusting screw and an elevation adjusting screw for aiming said laser light source in azimuth and elevation, respectively, said outer light housing having one or more openings through which the azimuth adjusting screw and the elevation adjusting screw can be adjusted.

17. The light mountable on a handgun of claim 10 wherein the control circuit of said light module comprises:
a control processor having a control input for receiving a signal, having a first control output, having a second control output for selectively energizing said illumination light source and said laser aiming light source, and having first and second power terminals at which electrical power to operate said control processor is received;
at least one electrical switch contact of the at least one electrical switch of said light module selectively connecting one of first and second terminals at which electrical power is received from the source of electrical power to the control input of said control processor to cause said control processor to selectively energize said illumination light source and said laser aiming light source;
a first controllable electronic device having a controllable conduction path connected between said first terminal and the first power terminal of said control processor, and having a control electrode coupled to the first control output of said control processor;
wherein when electrical power from the source of electrical power is received at said first and second terminals, said control processor is responsive to a closure or to an opening or to both a closure and an opening of said at least one electrical switch contact to provide a control voltage at the first control output that is coupled to the control electrode of said first controllable electronic device to maintain said first controllable electronic device conductive, whereby said control processor then remains in a powered condition; and
wherein said control processor is responsive to a subsequent closure or to a subsequent opening or both a subsequent closure and a subsequent opening of said at least one electrical switch contact to remove the control voltage at the first control output that is coupled to the control electrode of said first controllable electronic device to render said first controllable electronic device nonconductive, whereby said control processor is then in an unpowered condition even when electrical power is received at said first and second terminals.

18. A light mountable on a handgun comprising:
a light module including in a light module housing an illumination light source and a laser aiming light source, a cavity for receiving a source of electrical power, at least one electrical switch, and a control circuit for selectively energizing said illumination light source and said laser aiming light source;
an outer light housing having first and second complementary housing parts enclosing said light module, the first and second complementary housing parts cooperating when together to define at a first end of the outer light housing a cavity configured to correspond to the size and shape of a trigger guard of the handgun;
whereby said light is mountable to the trigger guard of the handgun when the first and second complementary housing parts of the outer light housing are attached together with the trigger guard of the handgun in the cavity thereof and said light module therein;
said outer light housing having one or more openings at a second end thereof through which light produced by said illumination light source and said laser aiming light source may be emitted;
said outer light housing having an opening through which the at least one electrical switch of said light module is actuatable from outside said outer light housing;
said outer light housing including an access cover on an exterior surface thereof that is not adjacent the handgun, said access cover being openable when said light is mounted on a handgun for placing a source of electrical power into the light module housing and for removing the source of electrical power from the light module housing; and
a movable member disposed between said access cover and a side of the source of electrical power, wherein said movable member biases the source of electrical power against said control circuit.

19. The light mountable on a handgun of claim 18 wherein:
said access cover is closable to retain the source of electrical power in said light module housing; or said access cover is pivotably attached to one of the first and second complementary housing parts of said outer light housing; or said access cover is closable to retain the source of electrical power in said light module housing and is pivotably attached to one of the first and second complementary housing parts of said outer light housing.

20. The light mountable on a handgun of claim 18 wherein said movable member biases the source of electrical power against an electrical contact of said light module so that the side of the source of electrical power makes an electrical connection to the electrical contact.

21. The light mountable on a handgun of claim 18 wherein the first and second complementary housing parts of said outer light housing are attached together by one or more threaded fasteners, wherein tightening the one or more threaded fasteners clamps the trigger guard of the handgun in the cavity therefor defined by said first and second complementary housing parts.

22. The light mountable on a handgun of claim 18 in combination with at least a second outer light housing having first and second complementary housing parts for enclosing said light module, the first and second complementary housing parts of said second outer light housing cooperating when together to define at a first end of the outer light housing a cavity configured to correspond to the size and shape of a trigger guard of a different handgun than does the outer light housing of claim 18.

23. The light mountable on a handgun of claim 18 wherein said light module includes an azimuth adjusting screw and an elevation adjusting screw for aiming said laser light source in azimuth and elevation, respectively, said outer light housing having one or more openings through which the azimuth adjusting screw and the elevation adjusting screw can be adjusted.

24. The light mountable on a handgun of claim 18 wherein the control circuit of said light module comprises:

a control processor having a control input for receiving a signal, having a first control output, having a second control output for selectively energizing said illumination light source and said laser aiming light source, and having first and second power terminals at which electrical power to operate said control processor is received;

at least one electrical switch contact of the at least one electrical switch of said light module selectively connecting one of first and second terminals at which electrical power is received from the source of electrical power to the control input of said control processor to cause said control processor to selectively energize said illumination light source and said laser aiming light source;

a first controllable electronic device having a controllable conduction path connected between said first terminal and the first power terminal of said control processor, and having a control electrode coupled to the first control output of said control processor;

wherein when electrical power from the source of electrical power is received at said first and second terminals, said control processor is responsive to a closure or to an opening or to both a closure and an opening of said at least one electrical switch contact to provide a control voltage at the first control output that is coupled to the control electrode of said first controllable electronic device to maintain said first controllable electronic device conductive, whereby said control processor then remains in a powered condition; and wherein said control processor is responsive to a subsequent closure or to a subsequent opening or both a subsequent closure and a subsequent opening of said at least one electrical switch contact to remove the control voltage at the first control output that is coupled to the control electrode of said first controllable electronic device to render said first controllable electronic device nonconductive, whereby said control processor is then in an unpowered condition even when electrical power is received at said first and second terminals.

25. A light mountable on a handgun comprising:

a light housing including an illumination light source and a laser aiming light source, a first cavity for receiving a source of electrical power, at least one electrical switch, and a control circuit for selectively energizing said illumination light source and said laser aiming light source;

said light housing having first and second complementary housing parts that cooperate when together to define at a first end of said light housing a second cavity configured to correspond to the size and shape of a trigger guard of the handgun;

whereby said light is mountable to the trigger guard of the handgun when the first and second complementary housing parts of said light housing are attached together with the trigger guard of the handgun in the second cavity thereof;

said light housing having one or more openings at a second end thereof through which light produced by said illumination light source and said laser aiming light source may be emitted;

said light housing having an opening through which the at least one electrical switch is actuatable from outside said light housing;

said light housing including an access cover on an exterior surface thereof that is not adjacent the handgun, said access cover being openable when said light is mounted on a handgun for placing a source of electrical power into the first cavity of said light housing and for removing the source of electrical power from the first cavity of said light housing; and a movable member disposed between said access cover and a side of the source of electrical power, wherein said movable member biases the source of electrical power against said control circuit.

26. The light mountable on a handgun of claim 25 wherein:

said access cover is closable to retain the source of electrical power in said light housing; or said access cover is pivotably attached to one of the first and second complementary housing parts of said light housing; or said access cover is closable to retain the source of electrical power in said light housing and is pivotably attached to one of the first and second complementary housing parts of said light housing.

27. The light mountable on a handgun of claim 25 wherein said movable member biases the source of electrical power against an electrical contact of said control circuit so that the side of the source of electrical power makes an electrical connection to the electrical contact.

28. The light mountable on a handgun of claim 25 wherein the first and second complementary housing parts of said light housing are attached together by one or more threaded fasteners, wherein tightening the one or more threaded fasteners clamps the trigger guard of the handgun in the second cavity defined by said first and second complementary housing parts.

29. The light mountable on a handgun of claim 25 wherein said light housing further includes an azimuth adjusting screw and an elevation adjusting screw for aiming said laser light source in azimuth and elevation, respectively, said light housing having one or more openings through which the azimuth adjusting screw and the elevation adjusting screw can be adjusted.

30. The light mountable on a handgun of claim 25 wherein said control circuit comprises:
- a control processor having a control input for receiving a signal, having a first control output, having a second control output for selectively energizing said illumination light source and said laser aiming light source, and having first and second power terminals at which electrical power to operate said control processor is received;
- at least one electrical switch contact of the at least one electrical switch selectively connecting one of first and second terminals at which electrical power is received from the source of electrical power to the control input of said control processor to cause said control processor to selectively energize said illumination light source and said laser aiming light source;
- a first controllable electronic device having a controllable conduction path connected between said first terminal and the first power terminal of said control processor, and having a control electrode coupled to the first control output of said control processor;
- wherein when electrical power from the source of electrical power is received at said first and second terminals, said control processor is responsive to a closure or to an opening or to both a closure and an opening of said at least one electrical switch contact to provide a control voltage at the first control output that is coupled to the control electrode of said first controllable electronic device to maintain said first controllable electronic device conductive, whereby said control processor then remains in a powered condition; and
- wherein said control processor is responsive to a subsequent closure or to a subsequent opening or both a subsequent closure and a subsequent opening of said at least one electrical switch contact to remove the control voltage at the first control output that is coupled to the control electrode of said first controllable electronic device to render said first controllable electronic device nonconductive, whereby said control processor is then in an unpowered condition even when electrical power is received at said first and second terminals.

31. The light mountable on a handgun of claim 25 wherein said light housing includes:
- a light module including in a light module housing the illumination light source and the laser aiming light source, the cavity for receiving a source of electrical power, the at least one electrical switch, and the control circuit for selectively energizing said illumination light source and said laser aiming light source; and
- an outer light housing having first and second complementary housing parts enclosing said light module, the first and second complementary housing parts cooperating when together to define at a first end of the outer light housing the cavity configured to correspond to the size and shape of a trigger guard of the handgun.

\* \* \* \* \*